United States Patent
Hirschberg et al.

(10) Patent No.: US 7,739,611 B2
(45) Date of Patent: Jun. 15, 2010

(54) USER INTERFACE WITH CONNECTABLE ELEMENTS

(75) Inventors: Peter David Hirschberg, Linden, VA (US); Sreekant S. Kotay, Reston, VA (US); Corey Robert Lucier, Berryville, VA (US)

(73) Assignee: AOL Inc., Dulles, VA (US)

( * ) Notice: Subject to any disclaimer, the term of this patent is extended or adjusted under 35 U.S.C. 154(b) by 624 days.

(21) Appl. No.: 11/410,296

(22) Filed: Apr. 25, 2006

(65) Prior Publication Data

US 2007/0006136 A1    Jan. 4, 2007

Related U.S. Application Data

(60) Provisional application No. 60/674,281, filed on Apr. 25, 2005.

(51) Int. Cl.
    *G06F 3/00* (2006.01)
(52) U.S. Cl. ............. 715/762; 715/788; 715/799; 715/804
(58) Field of Classification Search ............. 715/723, 715/760, 799, 777, 762–767, 788, 804
    See application file for complete search history.

(56) References Cited

U.S. PATENT DOCUMENTS

| | | | | |
|---|---|---|---|---|
| 5,758,111 A * | 5/1998 | Shiratori et al. | ............. | 715/788 |
| 5,796,401 A * | 8/1998 | Winer | ............. | 345/619 |
| 5,801,699 A * | 9/1998 | Hocker et al. | ............. | 715/837 |
| 5,907,704 A * | 5/1999 | Gudmundson et al. | ............. | 717/100 |
| 6,313,835 B1 | 11/2001 | Gever et al. | | |
| 6,657,647 B1 * | 12/2003 | Bright | ............. | 715/856 |
| 6,694,044 B1 | 2/2004 | Pavloicet al. | | |
| 6,717,593 B1 * | 4/2004 | Jennings | ............. | 715/760 |
| 6,941,521 B2 | 9/2005 | Lin et al. | | |
| 6,956,593 B1 | 10/2005 | Gupta et al. | | |
| 6,981,211 B1 * | 12/2005 | Claussen et al. | ............. | 715/239 |
| 2002/0101431 A1 | 8/2002 | Fourney et al. | | |
| 2002/0103835 A1 * | 8/2002 | Kearney | ............. | 707/530 |
| 2003/0164847 A1 | 9/2003 | Zaima et al. | | |
| 2003/0184585 A1 * | 10/2003 | Lin et al. | ............. | 345/763 |
| 2004/0207659 A1 | 10/2004 | Goodman et al. | | |

(Continued)

OTHER PUBLICATIONS

Nullsoft, Winamp Version 2.95 (Screenshots), Build Date Jun. 24, 2003, Version 2.95.*

(Continued)

*Primary Examiner*—Ba Huynh
(74) *Attorney, Agent, or Firm*—Fish & Richardson P.C.

(57) ABSTRACT

A system for providing a user interface includes a first element tag and a second element tag. The first element tag specifies a first element that is associated with a class of connectable elements and includes a first order indicator that specifies an order of the first element. The second element tag specifies a second element that is associated with the class of connectable elements such that the first element and the second element can be connected. The second element tag includes a second order indicator that specifies an order of the second element. The order of the first element and the second element are related such that, when the first element and the second element are connected, the first element remains connected to the second element when the second element is moved, and the first element is separated from the second element when the first element is moved.

25 Claims, 36 Drawing Sheets

U.S. PATENT DOCUMENTS

| | | | |
|---|---|---|---|
| 2004/0230900 A1 | 11/2004 | Reylea et al. | |
| 2004/0243973 A1* | 12/2004 | Kwong et al. | 717/106 |
| 2004/0268269 A1* | 12/2004 | Breinberg | 715/851 |
| 2005/0165815 A1* | 7/2005 | Ozzie et al. | 707/100 |
| 2005/0188311 A1 | 8/2005 | Diesel et al. | |
| 2005/0240877 A1* | 10/2005 | Baudisch et al. | 715/764 |
| 2005/0289478 A1* | 12/2005 | Landman et al. | 715/804 |
| 2006/0031773 A1* | 2/2006 | Uchida | 715/760 |

OTHER PUBLICATIONS

Griffiths, Ian et al, .Net Windows Forms: In a Nutshell A Desktop Quick Reference, O'Reilly & Associates, Inc., (Mar. 2003). First Edition.

Rector, Brent, Introducing "Longhorn" for Developers, Microsoft Corporation, Oct. 2003, available at http//msdn.microsoft.com/en-us/library/aa186116.aspx.

Macromedia Flash: Using Flash 8, Macromedia, Sep. 2005.

"Synchronized Multimedia Integration Language (SMIL 2.0)—[Second Edition]," W3C Recommendation, Jan. 7, 2005, available at: htt;//www.w3.org/TR/2005/REC-SMIL2-20050107/amil20.html.

"XULPlanet: Why Use XUL?," available at: http://xulplanet.com/tutorials/whyxul.html, as of Oct. 9, 2004, retrieved from http://web.archive.org/web/20041009123913/http://wulplanet.com/tutorials/whyxul.html.

"XUL Element and Script Reference," available at http://www.xulplanet.com/references/elemrefquickref.html, as of Oct. 9, 2004, retrieved from http://web.archive.org/web/20041207023823/www.xulplanet.com/references/elemref/quickref.html.

Macromedia FLEX: Getting Started with Flex, Macromedia, Inc., Nov. 2004.

"Extensible Markup Language (XML) 1.0 (Third Edition)," WSC Recommendation, Feb. 4, 2004, available at: http://www.w3.org/TR/2004/REC-xml-20040204/.

"Cascading Style Sheets, Level 2, revision 1 CSS 2.1 Specification," WSC Working Drafts, Jun. 13, 2005, available at http://www.w3.org/TR/2005/WD-CSS22-20050613/.

"ECMAScript Language Specification: Standards ECMA-262," ECMA, $3^{rd}$ Edition, Dec. 1999.

"ECMAScript for XML (E4X) Specification: Standard ECMA-357," ECMA International, $1^{st}$ Edition, Jun. 2004.

"HTML 4.01 Specification," WSC Recommendation, Dec. 24, 1999, available at http://www.w3.org/TR/html401/.

"XBL-XML Binding Language," W3C Note, Feb. 23, 2001, available at: http://www.23.org/TR/2001/Note-xbl-200102231/.

Nullsoft, Winamp Version 2.95 *Screenshots), Build Date Jun. 24, 2003, Version 2.95.

Tech Soft 3D, Animation XML Tags for HSF, Feb. 17, 2003, OpneHSF, http://www.openhsf.org/docs_hsf/HSFSpec/animation.htm.

* cited by examiner

6000

```
<?xml version="1.0" encoding="UTF-8"?>                          }6002
<?import href="box://boxelyToolkit/theme/toolkit.box"?>         }6004

<aolWindow xmlns="http://www.aol.com/boxely/box.xsd"
    xmlns:s="http://www.aol.com/boxely/style.xsd"
    xmlns:on="http://www.aol.com/boxely/reaction.xsd" overflow="scroll"
    id="window" translucent="false" chromeless="true" s:width="500" s:height="150"
    title="Progress Bar Sample"
    on:presented="onPresented();"
    on:destroyed="onSceneClose();">

<vbox s:padding="20" s:flex="1">
        <aolLabel>
            <binding elementSource="progress" targetProperty="value"    }6020
             path="value" method="twoWay"/>
        </aolLabel>                                                           6010
        <hbox>
            <aolProgressBar max="100" min="0" s:margin="10" id="progress"
             s:width="200">
                <binding elementSource="slider" targetProperty="value"   }6022  }6018
                 path="value" method="twoWay"/>
            </aolProgressBar>                                                     6012
        </hbox>
6014{   <aolSlider id="slider" max="100" min="0" scale="1" value="50"/>
        <aolLabel>
6016{       <binding elementSource="_prevSibling" targetProperty="value" }6024
             path="value" method="twoWay"/>
        </aolLabel>
    </vbox>

</aolWindow>
```

```
<?xml version="1.0" encoding="UTF-8"?>                          6100

<?boxely version="1.0"?>

<!DOCTYPE window SYSTEM "box://boxelyToolkit/resources/localization.dtd">

<?import href="box://boxelyToolkit/content/styles.box"?>  } 6126
<?import href="box://boxelyToolkit/content/behaviors.box"?>

<library xmlns="http://www.aol.com/boxely/resource.xsd"
    xmlns:box="http://www.aol.com/boxely/box.xsd"                6102
    xmlns:s="http://www.aol.com/boxely/style.xsd"
    xmlns:on="http://www.aol.com/boxely/reaction.xsd"
    6112   persists="true">

<gadget id="aolWindow" type="window" language="jscript" code="box://boxelyToolkit/content/
  aolWindow.js">
    <attributes focusMode="defer" resizable="true" accRole="window"
6114   icon="#bmp.icon.default" minimizable="true" maximizable="true"
    closable="true"/>
    <parts>
      <box:hbox id="titleGroup" inherits="active"
        on:mouseDown="gadget:onClickTitleBar();"
        on:doubleClick="gadget:onDoubleClickTitlebar();">
        <box:vbox s:vAlign="center">
          <box:image id="titleBarIcon" inherits="src=icon,active" s:padding="0 0 0 5"
            on:doubleClick="gadget:onDoubleClickSystemMenu();"
            on:mouseDown="gadget:onClickSystemMenu();" />
        </box:vbox>
        <box:vbox s:flex="1" id="windowBar">
          <box:aolTitleBar id="titleBar" s:flex="0" inherits="active">
6116        <box:aolLabel dragMode="window" id="titleBarLabel"
              inherits="value=title,active" autoTooltip="none"/>
            <box:hbox id="windowControls">
              <box:aolTitleBarMinButton id="titleBarMin" message="minimize"
                inherits="active,flash,isFlashing">
                <box:binding elementSource="_gadget"
                  targetProperty="collapsed" path="minimizable"
                  method="twoWay" sourceTransformer="toolkit:not"
                  targetTransformer="toolkit:not"/>
              </box:aolTitleBarMinButton>
```

FIG. 6b(1)

```xml
<box:box> <!-- container for max/restore, so that we can allow disabling maximizability -->
<box:binding elementSource="_gadget" targetProperty="collapsed" path="maximizable"
method="twoWay" sourceTransformer="toolkit:not" targetTransformer="toolkit:not"/>
    <box:aolTitleBarMaxButton id="titleBarMax" message="maximize"
    inherits="active,flash,isFlashing">
        <box:binding elementSource="_gadget" targetProperty="collapsed"
            path="maximized" method="twoWay"/>
        <box:binding elementSource="_gadget" targetProperty="hidden"
            path="maximized" method="twoWay"/>
    </box:aolTitleBarMaxButton>
    <box:aolTitleBarRestoreButton id="titleBarRestore"
        message="restore"inherits="active,flash,isFlashing">
        <box:binding elementSource="_gadget" targetProperty="collapsed"
            path="maximized" method="twoWay" sourceTransformer="toolkit:not"
            targetTransformer="toolkit:not">
        <box:binding elementSource="_gadget" targetProperty="hidden"
            path="maximized" method="twoWay" sourceTransformer="toolkit:not"
            targetTransformer="toolkit:not"/>
    </box:aolTitleBarRestoreButton>
</box:box>
<box:aolTitleBarCloseButton id="titleBarClose"
    inherits="active,flash,isFlashing">
    <box:binding elementSource="_gadget" targetProperty="collapsed"
        path="closable" method="twoWay" sourceTransformer="toolkit:not"
        targetTransformer="toolkit:not"/>
</box:aolTitleBarCloseButton>
            </box:hbox>
        </box:aolTitleBar>
    </box:vbox>
</box:hbox>
<!-- the stroke separator between the title bar and the window contents -->
<box:hbox id="aolTitleBarSpacer" />
<box:box id="windowGripTop" inherits="active"/>
<box:hbox s:flex="1">
```

FIG. 6b(2)

```
<box:box id="windowGripLeft" inherits="active"/>
<box:vbox id="aolWindowContent"
inherits="$overflow=overflow,$padding=internalPadding" >
    <box:content/>
</box:vbox>
<box:box id="windowGripRight" inherits="active"/>
</box:hbox>
<box:box id="windowGripBottom" inherits="active"/>
</parts>
<behavior>
<reaction event="doubleclick" action="gadget:onDoubleClickWindow();"/>
<reaction event="attributeSet" attributeName="accTheme"
 action="gadget:onAccThemeChange();"/>
</behavior>
</gadget>

<gadget id="aolLabel" type="text" >
    <attributes focusMode="ignore" accRole="staticText" autoTooltip="aolLabel"
    autoHighlight="default"/>
</gadget>

<gadget id="aolSlider" type="range" >
    <attributes view="range" axis="x" engaged="true" blockEvents="false"
    accRole="slider"/>
    <parts>
        <box:thumb id="thumb" engaged="true" inherits="axis" focusMode="defer"/>
    </parts>
    <behavior inherits="box://boxelyToolkit/content/behaviors.box#slider"/>
</gadget>
```

FIG. 6b(3)

```
<gadget id="aolProgressBar" type="select" language="jscript" code="box://boxelyToolkit/
content/aolProgress.js">
  <attributes axis="x" focusMode="ignore" accRole="progressBar" min="0" max="100"/>
  <parts>
    <box:box id="numeratorStroke" collapsed="true">
      <box:binding elementSource="_gadget" path="value"
        sourceTransformer="gadget:onSetValue();" method="oneWay"/>
    </box:box>
    <box:box id="numeratorContainer" collapsed="true">
      <box:binding elementSource="_gadget" path="value"
        sourceTransformer="gadget:onSetValue();" method="oneWay"/>
      <box:box id="numerator"/>
    </box:box>
  </parts>
  <behavior>
    <reaction event="presented" action="gadget:onPresented();" />
    <reaction event="attributeSet" attributeName="value"
      action="gadget:onSetValue();" />
  </behavior>
</gadget>
</library>
```

```xml
<?xml version="1.0" encoding="UTF-8"?>
<?boxely version="1.0"?>
<library xmlns="http://www.aol.com/boxely/resource.xsd"
 persists="true">
  <behavior id="slider">
    <reaction event="keyPress" keyCode="UP" action="toolkit:NudgeUp"/>
    <reaction event="keyPress" keyCode="DOWN" action="toolkit:NudgeDown"/>
    <reaction event="keyPress" keyCode="LEFT" action="toolkit:NudgeUp"/>
    <reaction event="keyPress" keyCode="RIGHT" action="toolkit:NudgeDown"/>
    <reaction event="keyPress" keyCode="HOME" action="toolkit:SetMin"/>
    <reaction event="keyPress" keyCode="END" action="toolkit:SetMax"/>
    <reaction event="keyPress" keyCode="PAGEUP" action="toolkit:NudgePageUp"/>
    <reaction event="keyPress" keyCode="PAGEDOWN"
     action="toolkit:NudgePageDown"/>
    <reaction event="mouseWheel" detail="1" action="toolkit:NudgePageUp"/>
    <reaction event="mouseWheel" detail="-1" action="toolkit:NudgePageDown"/>
  </behavior>
</library>
```

FIG. 6c

```xml
<?xml version="1.0" encoding="UTF-8"?>      6300

<?boxely version="1.0"?>

<library xmlns="http://www.aol.com/boxely/resource.xsd">

<style tag="scrollbar"
        position="fixed"/>                  6304

<style tag="gbox"
        overflow="scroll"/>                 6306

<style tag="aolListBox"
        overflow="scroll"
        maxWidth="auto"
        maxHeight="auto"/>                  6308

<style tag="grid"
        overflow="scroll"
        maxWidth="auto"
        maxHeight="auto"/>                  6310

<style tag="window"
        position="fixed"
        layer="stack"
        orient="vertical"/>                 6312

<style tag="aolWindow"
        position="fixed"
        layer="stack"
        orient="vertical"/>                 6314

<style tag="aolHelpBox"
        position="fixed"
        layer="stack"
        orient="vertical"/>                 6316

<style tag="aolAppWindow"
        position="fixed"
        layer="stack"
        orient="vertical"/>                 6318

</library>
```

```
<?xml version="1.0" encoding="UTF-8"?>
<?boxely version="1.0"?>
<library xmlns="http://www.aol.com/boxely/resource.xsd"
  accLibrary="box://boxelyToolkit/theme/accToolkit.box">
<style tag="aolSlider" margin="2 4" fill="url(#sliderGradient)">
  <attribute name="axis" value="x" maxHeight="6*" minHeight="6*"
    orient="horizontal"/>
  <attribute name="axis" value="y" maxWidth="6*" minWidth="6*" orient="vertical"/>
  <part name="paging" fill="#55000000" />
  <part name="thumb" layer="above" vAlign="center" hAlign="center">
    <attribute name="axis" value="x" offsetTop="-3"/>
    <attribute name="axis" value="y" offsetLeft="-8"/>
  </part>
  <part name="gripper" layer="above" fill="url(#bmp.slider.thumb)" fillSlice="2"
    fillSize="both" minWidth="20*" minHeight="12*">
    <state name="pressed" colorSubtract="#000C0C0A"/>
    <state name="hovered" colorAdd="#00002233"
      animate="url(#controlHover)"
      animateExit="url(#controlDehover)"/>
  </part>
</part>
</style>
```

```
<style tag="aolProgressBar" padding="0" height="11*" minHeight="11*"
minWidth="100*" fill="url(#progressGradientBack)" fillCornerRadius="2" flex="1">
    <part name="numeratorContainer"
      position="fixed"
      left="1"
      top="1"
      bottom="1"
      />
    <part name="numerator"
      fill="url(#bmp.progress.numerator)"
      fillSize="y"
      fillRepeat="x"
      fillRepeatOriginX="0"
      fillRepeatOriginY="0"
      animate="url(#ani.progress.animation)"
      position="fixed"
      left="0"
      top="0"
      right="2"
      bottom="0"
      zIndex="1"
      />
    <part name="numeratorStroke"
      fill="url(#progressGradientNumeratorStroke)"
      fillCornerRadius="2"
      position="fixed"
      left="0"
      top="0"
      bottom="0"
      zIndex="0"
      />
</style>
```

```
<style tag="aolWindow" top="center" left="center" padding="3" fill="url(#windowGradient)"
stroke="#1E7DCB" strokeWidth="2" overflow="none" minWidth="130"
minHeight="25" translucent="false" chromeless="true">

<attribute name="active" value="false" stroke="#D5DBE3"/>
    <attribute name="active" value="false" bevelRadius="0"/>
    <attribute name="active" value="false" fill="#FFFFFF"/>

<part name="titleBar" padding="1 0 1 0" fill="url(#windowTitleBarGradient)"
    vAlign="center" orient="horizontal" overflow="hidden">
        <attribute name="active" value="false" fill="url(#windowTitleBarGradientFlip)"/>
    </part>
    <part name="titleBarIcon" maxWidth="18" maxHeight="18">
        <attribute name="active" value="false" opacity="50%"/>
    </part>
    <part name="titleGroup" fill="url(#windowTitleBarGradient)">
        <attribute name="active" value="false" fill="url(#windowTitleBarGradientFlip)"/>
    </part>
    <part name="titleBarLabel" crop="right" flex="1" width="50" maxWidth="auto" padding="0"
    fontFamily="Tahoma" fontSize="12px" fontBold="true" textColor="#FF0860A8">
        <attribute name="active" value="false" textColor="#C8C8C8"/>
    </part>

<part name="windowControls" vAlign="center" hSpace="1" padding="0 1 0 0"/>

<part name="titleBarMin" top="center" padding="0" >
        <attribute name="active" value="false" opacity="30%"/>
    </part>

<part name="titleBarMax" top="center" padding="0" >
        <attribute name="active" value="false" opacity="30%"/>
    </part>

<part name="titleBarRestore" top="center" padding="0" >
        <attribute name="active" value="false" opacity="30%"/>
    </part>

<part name="titleBarClose" top="center" padding="0" >
        <attribute name="active" value="false" opacity="30%"/>
    </part>
```

6408 (left brace around titleBarLabel block)
6402 (right brace around lower part blocks)

FIG. 6e(3)

```
<part name="aolTitleBarSpacer" fill="#DCDCDC" height="1" left="0" right="0" />
<part name="aolWindowContent" inherits="#windowPane" flex="1" margin="0 5 8
5" layer="above" zIndex="2" maxHeight="auto" maxWidth="auto" overflow="hidden"/>

<part name="aolWindowStatusBar" height="25"/>
  <part name="windowGripLeft" maxWidth="0" minWidth="0" margin="0" top="0"
  bottom="0" fill="url(#windowGripLeftGradient)"/>
  <part name="windowGripRight" maxWidth="0" minWidth="0" margin="0" top="0"
  bottom="0" fill="url(#windowGripRightGradient)"/>
  <part name="windowGripBottom" maxHeight="0" minHeight="0" margin="0"
  left="0" right="0" fill="url(#windowGripBottomGradient)"/>
    <attribute name="translucent" value="true" />
</style>

<style tag="aolLabel" inherits="#baseText" margin="2 4" padding="0">
  <attribute name="autoHighlight" value="on"
  textHighlight="url(#brush.searchHilight)"/>
  <attribute name="autoHighlight" value="off" textHighlight="none"/>
  <state name="disabled" opacity="50%"/>
</style>

</library>
```

FIG. 6e(4)

```
//*********************************************************************
//
//    File Name:   aolWindow.js
//                                                                    6500
//
//********************************************************************* function component (_gadget)
{
}                                                                     6502 component.prototype.onDoubleClickTitlebar = function()
{
   this.toggleMaximized();                                            6504
} component.prototype.onDoubleClickWindow = function()
{
   var event   = shell.getCurrentEvent();
   var caption = this._gadget.getPartById("titleBar");

if (event && caption)
   {
      if (event.targetBox == this._gadget &&
          event.frameY < caption.frameY)
      {                                                               6506
         this.toggleMaximized();
      }
   }
} component.prototype.onAccThemeChange = function()
{
   if (appUtils.accTheme)
   {
      var rb = this.scene.rootBox;
      rb.setAttribute("translucent", "false", false)

var collBox = rb.getPartById("titleGroup");                     6508
      if (collBox != null)
         collBox.collapsed = true;

rb.chromeless = false;
   }
}
```

FIG. 6f(1)

```
component.prototype.toggleMaximized = function()
{
   if (this._gadget.getAttribute("maximizable") == "true")
   {
      if (this._gadget.getAttribute("maximized") == "false")
         this._gadget.setAttribute("maximized", "true", true);
      else
         this._gadget.setAttribute("maximized", "false", true);
   }
}
```
⎫
⎬ 6500
⎭

} 6510

```
component.prototype.onClickSystemMenu = function()
{
   var event = shell.getCurrentEvent();

if (event && (event.button==1 || event.button==2))
   {
      var theBox = event.targetBox;

if (theBox)
      {
          this.scene.displaySystemMenu(theBox, theBox.screenX, theBox.screenY + theBox.boxHeight);
      }
   }
}
```
} 6512

```
component.prototype.onDoubleClickSystemMenu = function()
{
   this.scene.close();

var event = shell.getCurrentEvent();

if (event)
   {
      event.stopPropagation();
   }
}
```
} 6514

```
component.prototype.onClickTitleBar = function()
{
   var event = shell.getCurrentEvent();

if (event && event.button==2)
      this.scene.displaySystemMenu(null, event.screenX, event.screenY);
}
```
} 6516

FIG. 6f(2)

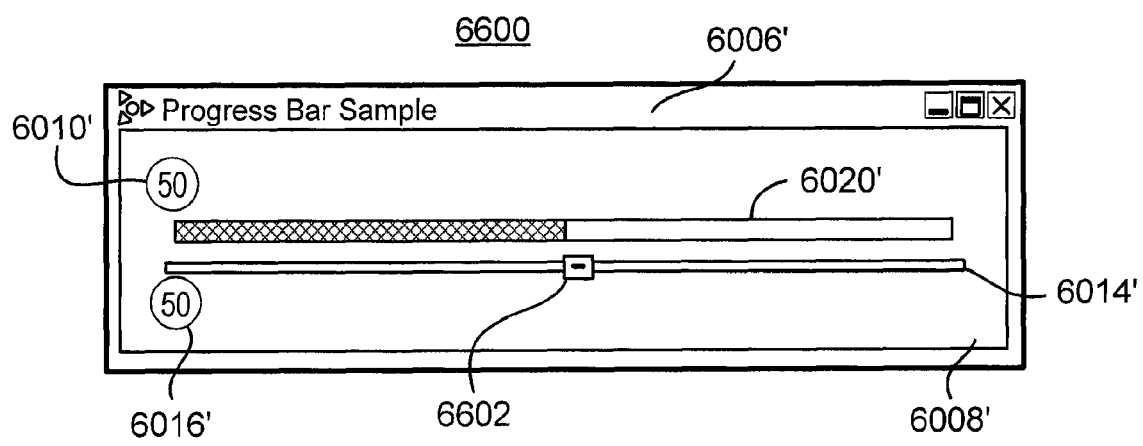
FIG. 6g(1)

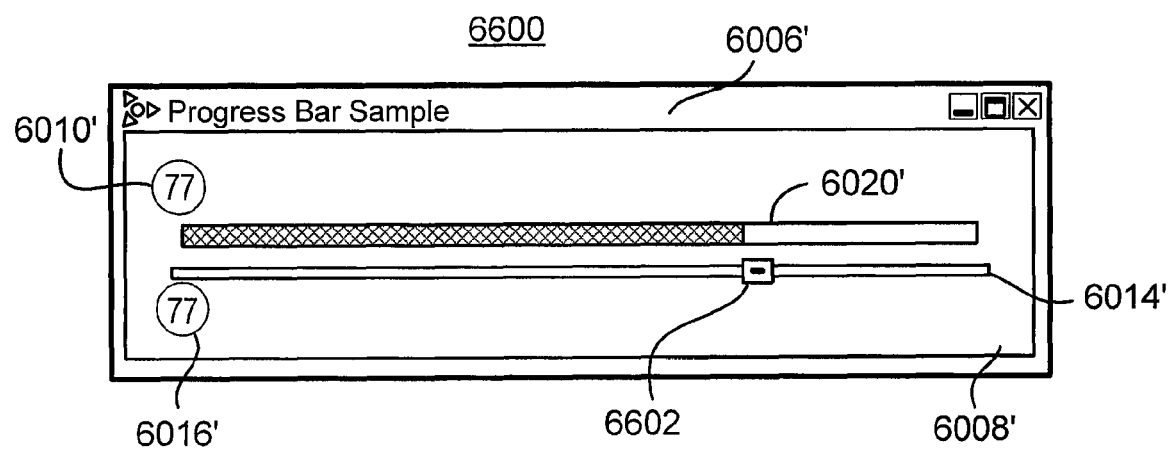
FIG. 6g(2)

```
<?xml version="1.0" encoding="UTF-8"?>                           700

<?import href="box://boxelySamples/theme/samples.box"?>

<window xmlns="http://www.aol.com/boxely/box.xsd"
        xmlns:s="http://www.aol.com/boxely/style.xsd"
        xmlns:on="http://www.aol.com/boxely/reaction.xsd"
        id="window" translucent="false" s:fill="#16164C"
        title="Simple Animation">

704 {  <script id="main" language="jscript" href="box://boxelySamples/content/animation/
       animateSimple.js"/>

<library xmlns="http://www.aol.com/boxely/resource.xsd">

716 {    <animation id="myAnimate">
           <animate name="left" type="style" from="before" to="400" begin="0ms"   } 722
           end="500ms"/>
         </animation>

718 {    <animation id="myAnimateExit">
           <animate name="left" type="style" from="before" to="50" begin="0ms"   } 724
           end="500ms" dynamics="spring" />
         </animation>

706 {    <style target="theBox"
             position="fixed"                                                     702
             top="50"
720 {        left="50">
             <attribute name="myAnimation" animate="url(#myAnimate)"              } 726
             animateExit="url(#myAnimateExit)"/>
         </style>

</library>

708 {  <image id="theBox" src="box://boxelySamples/content/images/aollogo.png"/>

<hbox s:flex="1" s:vAlign="end">
710 {    <aolButton label="Move Right" on:command="OnPlay();"/>   } 712
         <aolButton label="Move Left" on:command="OnStop();"/>    } 714
       </hbox>

</window>
```

```
function OnPlay()
{
        var box = scene.getBoxById("theBox");
        box.setAttribute("myAnimation", "true", "true");
}
```
⎫
⎬ 742
⎭

```
function OnStop()
{
        var box = scene.getBoxById("theBox");
        box.removeAttribute("myAnimation", "true");
}
```
⎫
⎬ 744
⎭

FIG. 7b

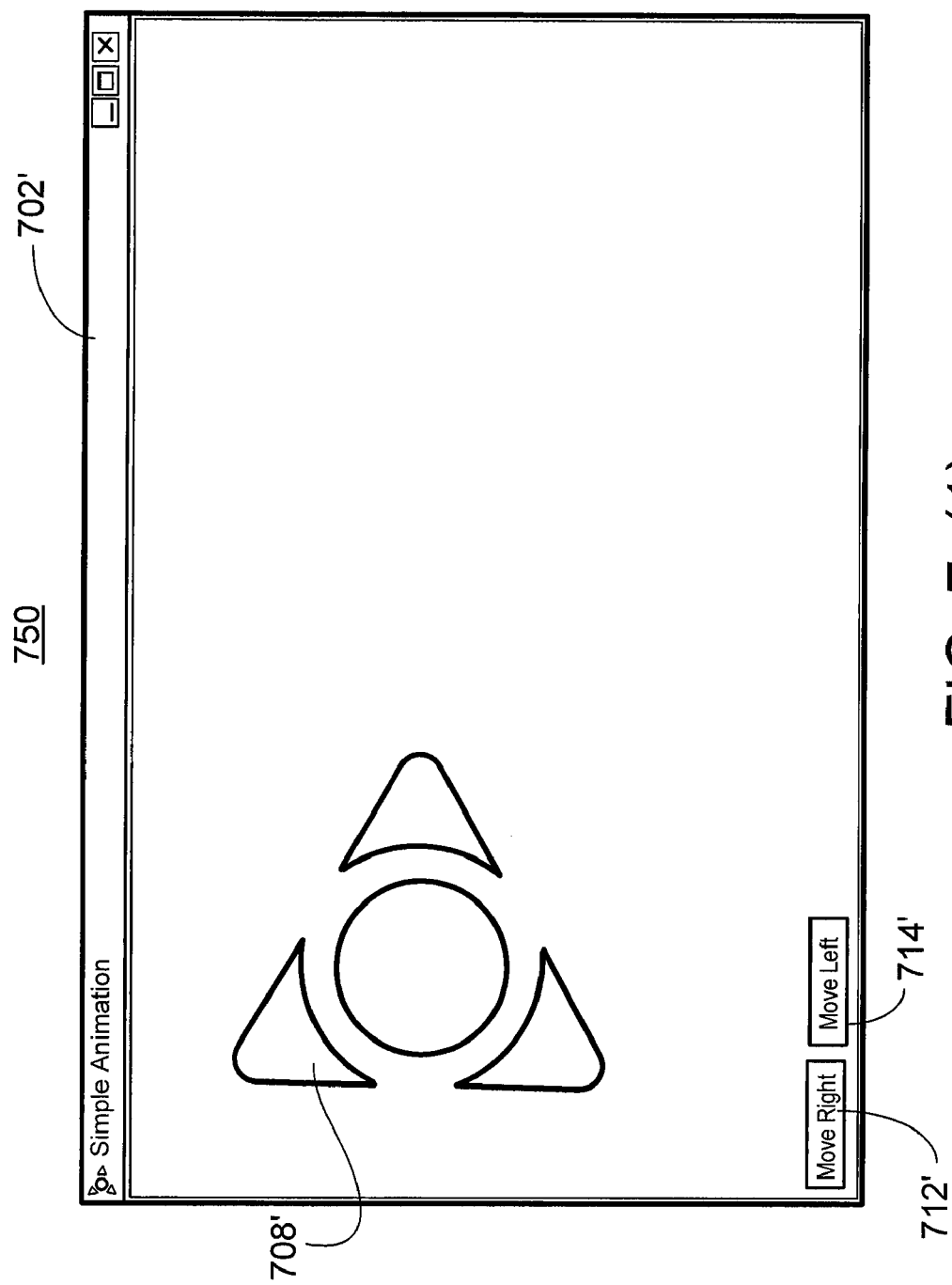
FIG. 7c(1)

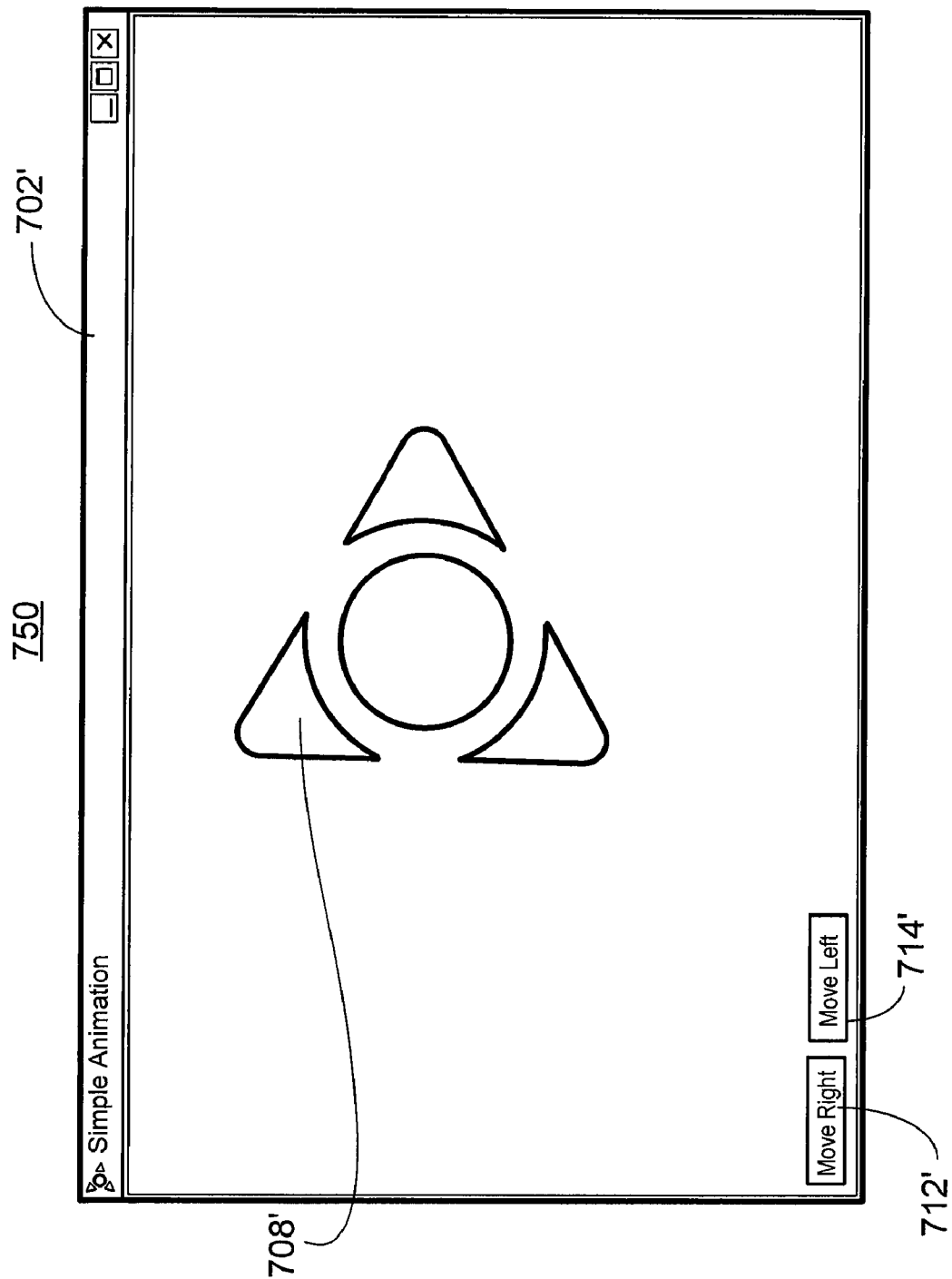
FIG. 7c(2)

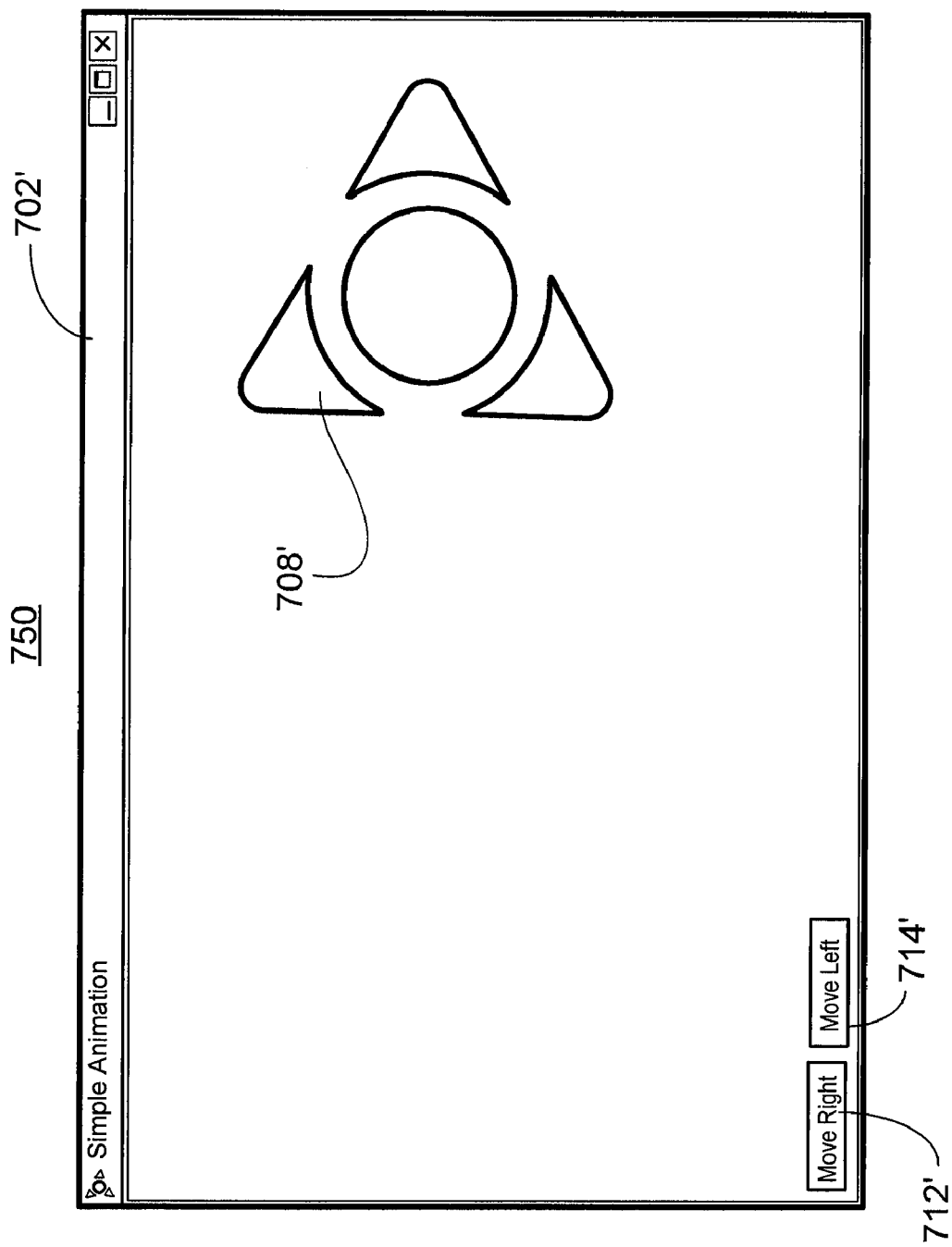
FIG. 7c(3)

800

```xml
<?xml version="1.0" encoding="UTF-8"?>

<?import href="box://boxelySamples/theme/samples.box"?>

<aolwindow xmlns="http://www.aol.com/boxely/box.xsd"
    xmlns:s="http://www.aol.com/boxely/style.xsd"
    xmlns:on="http://www.aol.com/boxely/reaction.xsd" chromeless="true"
    id="window" translucent="false" s:height="300" s:width="400"
    title="Base Window (no magnetics or snapping)" resizable="true" s:fill="white">

<library xmlns="http://www.aol.com/boxely/resource.xsd"
        xmlns:box="http://www.aol.com/boxely/box.xsd"
        xmlns:on="http://www.aol.com/boxely/reaction.xsd"
        xmlns:s="http://www.aol.com/boxely/style.xsd">
</library>

<script id="main" language="jscript"
    href="box://boxelySamples/content/magnetic/magnetic.js"/>
```

804 { `<aolButton label="Push to open magnetic child windows" on:click="Create();" />`

`</aolwindow>`

```xml
<?xml version="1.0" encoding="UTF-8"?>

<?import href="box://boxelySamples/theme/samples.box"?>

<aolwindow xmlns="http://www.aol.com/boxely/box.xsd"
    xmlns:s="http://www.aol.com/boxely/style.xsd"
    xmlns:on="http://www.aol.com/boxely/reaction.xsd" chromeless="true"

snapToWorkspace="15"
    snapToBox="20"
    snapToBoxOrder="0"
    snapToBoxClass="magClass1"
    title="Magnetic Class 1"

id="window" translucent="false" s:left="50" s:top="100" s:height="100" s:width="200"
    resizable="true" s:fill="white">

<library xmlns="http://www.aol.com/boxely/resource.xsd"
    xmlns:box="http://www.aol.com/boxely/box.xsd"
    xmlns:on="http://www.aol.com/boxely/reaction.xsd"
    xmlns:s="http://www.aol.com/boxely/style.xsd">
</library>

<vbox s:flex="1" s:vAlign="center">
    <hbox>
      <aolLabel value="Class" s:width="25"/>
      <aolLabel value="" s:flex="1">
        <binding elementSource="window" targetProperty="value" path="snapToBoxClass"
        method="twoWay"/>
      </aolLabel>
    </hbox>
    <hbox>
      <aolLabel value="Order" s:width="25"/>
      <aolLabel value="" s:width="30" s:minWidth="30" filter="toolkit:numeric">
        <binding elementSource="window" targetProperty="value" path="snapToBoxOrder"
        method="twoWay"/>
      </aolLabel>
    </hbox>
    <hbox>
      <aolLabel value="SnaptoOffset: 0"/>
    </hbox>
  </vbox>

</aolwindow>
```

```xml
<?xml version="1.0" encoding="UTF-8"?>

<?import href="box://boxelySamples/theme/samples.box"?>

<aolwindow xmlns="http://www.aol.com/boxely/box.xsd"
    xmlns:s="http://www.aol.com/boxely/style.xsd"
    xmlns:on="http://www.aol.com/boxely/reaction.xsd" chromeless="true"

snapToWorkspace="15"
    snapToBox="20"
    snapToBoxOrder="1"
    snapToBoxClass="magClass1"
    title="Magnetic Class 1"

id="window" translucent="false" s:left="50" s:top="250" s:height="100" s:width="200"
    resizable="true" s:fill="white">

<library xmlns="http://www.aol.com/boxely/resource.xsd"
    xmlns:box="http://www.aol.com/boxely/box.xsd"
    xmlns:on="http://www.aol.com/boxely/reaction.xsd"
    xmlns:s="http://www.aol.com/boxely/style.xsd">
</library>

<vbox s:flex="1" s:vAlign="center">
      <hbox>
        <aolLabel value="Class" s:width="25"/>
        <aolLabel value="" s:flex="1">
          <binding elementSource="window" targetProperty="value" path="snapToBoxClass"
            method="twoWay"/>
        </aolLabel>
      </hbox>
      <hbox>
        <aolLabel value="Order" s:width="25"/>
        <aolLabel value="" s:width="30" s:minWidth="30" filter="toolkit:numeric">
          <binding elementSource="window" targetProperty="value" path="snapToBoxOrder"
            method="twoWay"/>
        </aolLabel>
      </hbox>
      <hbox>
        <aolLabel value="SnaptoOffset: 0"/>
      </hbox>
    </vbox>

</aolwindow>
```

```
<?xml version="1.0" encoding="UTF-8"?>                                          860

<?import href="box://boxelySamples/theme/samples.box"?>

<aolwindow xmlns="http://www.aol.com/boxely/box.xsd"
    xmlns:s="http://www.aol.com/boxely/style.xsd"
    xmlns:on="http://www.aol.com/boxely/reaction.xsd" chromeless="true"

snapToWorkspace="15"
    snapToBox="20"
    snapToBoxOrder="0"
    snapToBoxClass="magClass2"
    snapToOffset="-10"
    title="Magnetic Class 2"

id="window" translucent="false" s:left="50" s:top="400" s:height="100" s:width="200"
    resizable="true" s:fill="white">

<library xmlns="http://www.aol.com/boxely/resource.xsd"
    xmlns:box="http://www.aol.com/boxely/box.xsd"
    xmlns:on="http://www.aol.com/boxely/reaction.xsd"
    xmlns:s="http://www.aol.com/boxely/style.xsd">
</library>                                                                      862

<vbox s:flex="1" s:vAlign="center">
      <hbox>
        <aolLabel value="Class" s:width="25"/>
        <aolLabel value="" s:flex="1">
          <binding elementSource="window" targetProperty="value" path="snapToBoxClass"
          method="twoWay"/>
        </aolLabel>
      </hbox>
      <hbox>
        <aolLabel value="Order" s:width="25"/>
        <aolLabel value="" s:width="30" s:minWidth="30" filter="toolkit:numeric">
          <binding elementSource="window" targetProperty="value" path="snapToBoxOrder"
          method="twoWay"/>
        </aolLabel>
      </hbox>
      <hbox>
        <aolLabel value="SnaptoOffset: -10"/>
      </hbox>
    </vbox>

</aolwindow>
```

FIG. 8c(3)

```xml
<?xml version="1.0" encoding="UTF-8"?>                                              870

<?import href="box://boxelySamples/theme/samples.box"?>

<aolwindow xmlns="http://www.aol.com/boxely/box.xsd"
    xmlns:s="http://www.aol.com/boxely/style.xsd"
    xmlns:on="http://www.aol.com/boxely/reaction.xsd" chromeless="true"

snapToWorkspace="15"
    snapToBox="20"
    snapToBoxOrder="1"
    snapToBoxClass="magClass2"
    snapToOffset="-10"
    title="Magnetic Class 1"

id="window" translucent="false" s:left="50" s:top="550" s:height="100" s:width="200"
    resizable="true" s:fill="white">

<library xmlns="http://www.aol.com/boxely/resource.xsd"
    xmlns:box="http://www.aol.com/boxely/box.xsd"
    xmlns:on="http://www.aol.com/boxely/reaction.xsd"
    xmlns:s="http://www.aol.com/boxely/style.xsd">
</library>

<vbox s:flex="1" s:vAlign="center">                                             872
      <hbox>
        <aolLabel value="Class" s:width="25"/>
        <aolLabel value="" s:flex="1">
           <binding elementSource="window" targetProperty="value" path="snapToBoxClass"
           method="twoWay"/>
        </aolLabel>
      </hbox>
      <hbox>
        <aolLabel value="Order" s:width="25"/>
        <aolLabel value="" s:width="30" s:minWidth="30" filter="toolkit:numeric">
           <binding elementSource="window" targetProperty="value" path="snapToBoxOrder"
           method="twoWay"/>
        </aolLabel>
      </hbox>
      <hbox>
        <aolLabel value="SnaptoOffset: -10"/>
      </hbox>
    </vbox>

</aolwindow>
```

FIG. 8c(4)

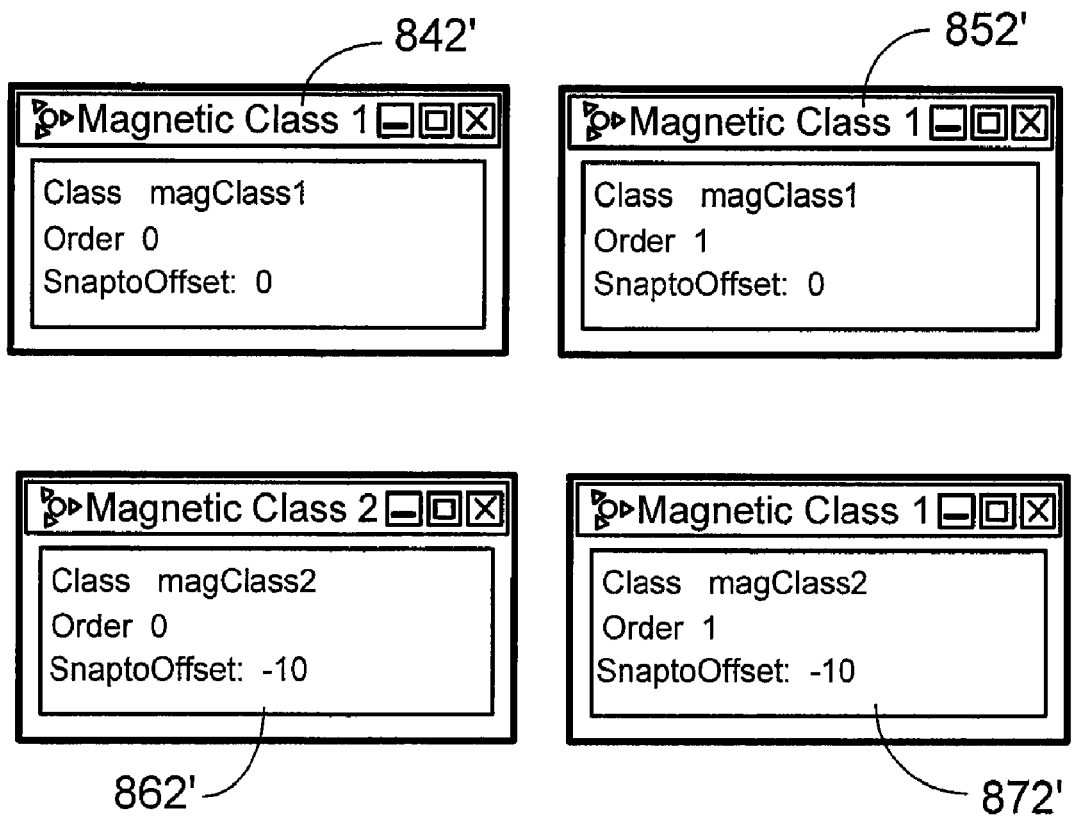
FIG. 8d(1)

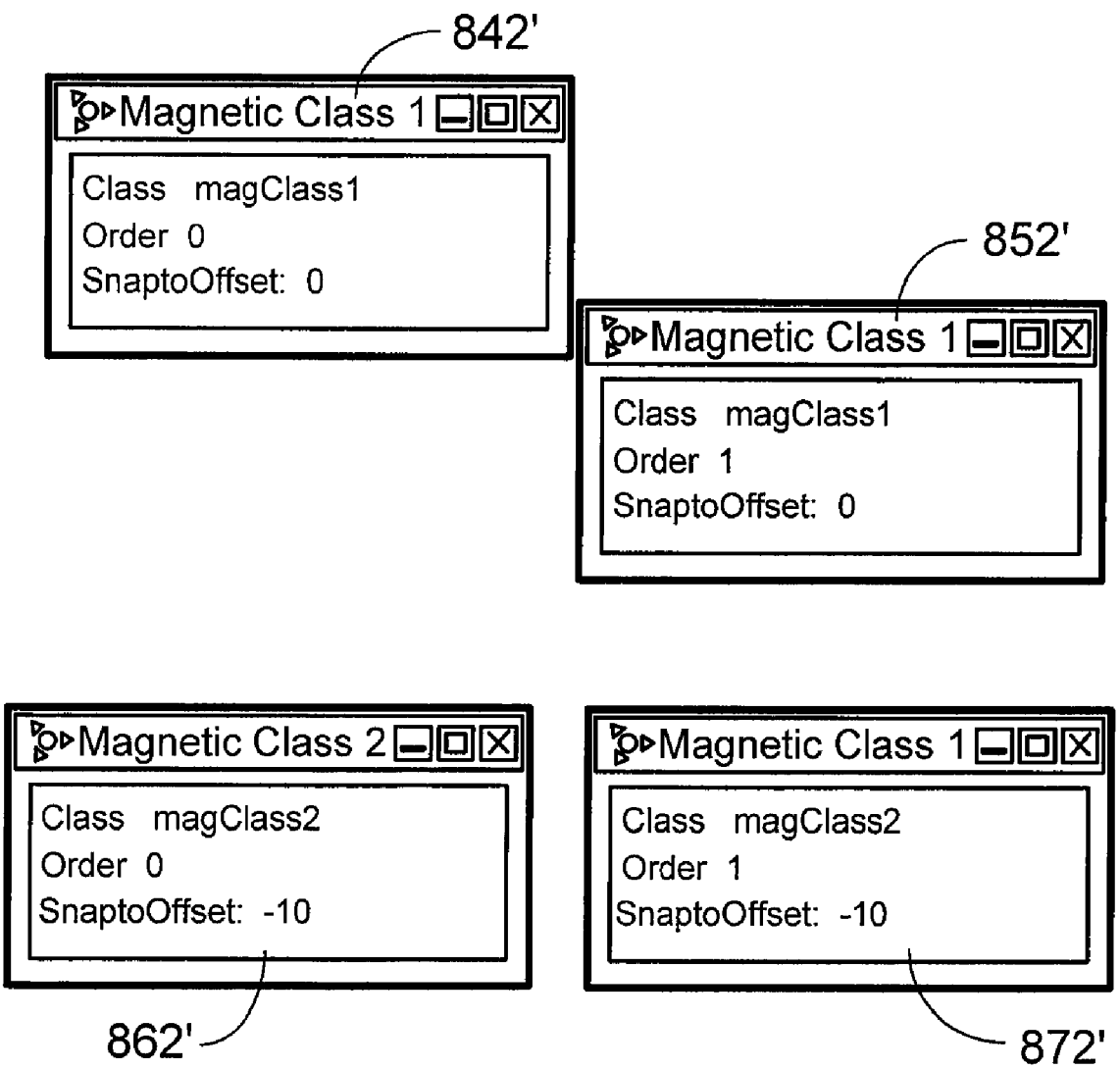
FIG. 8d(2)

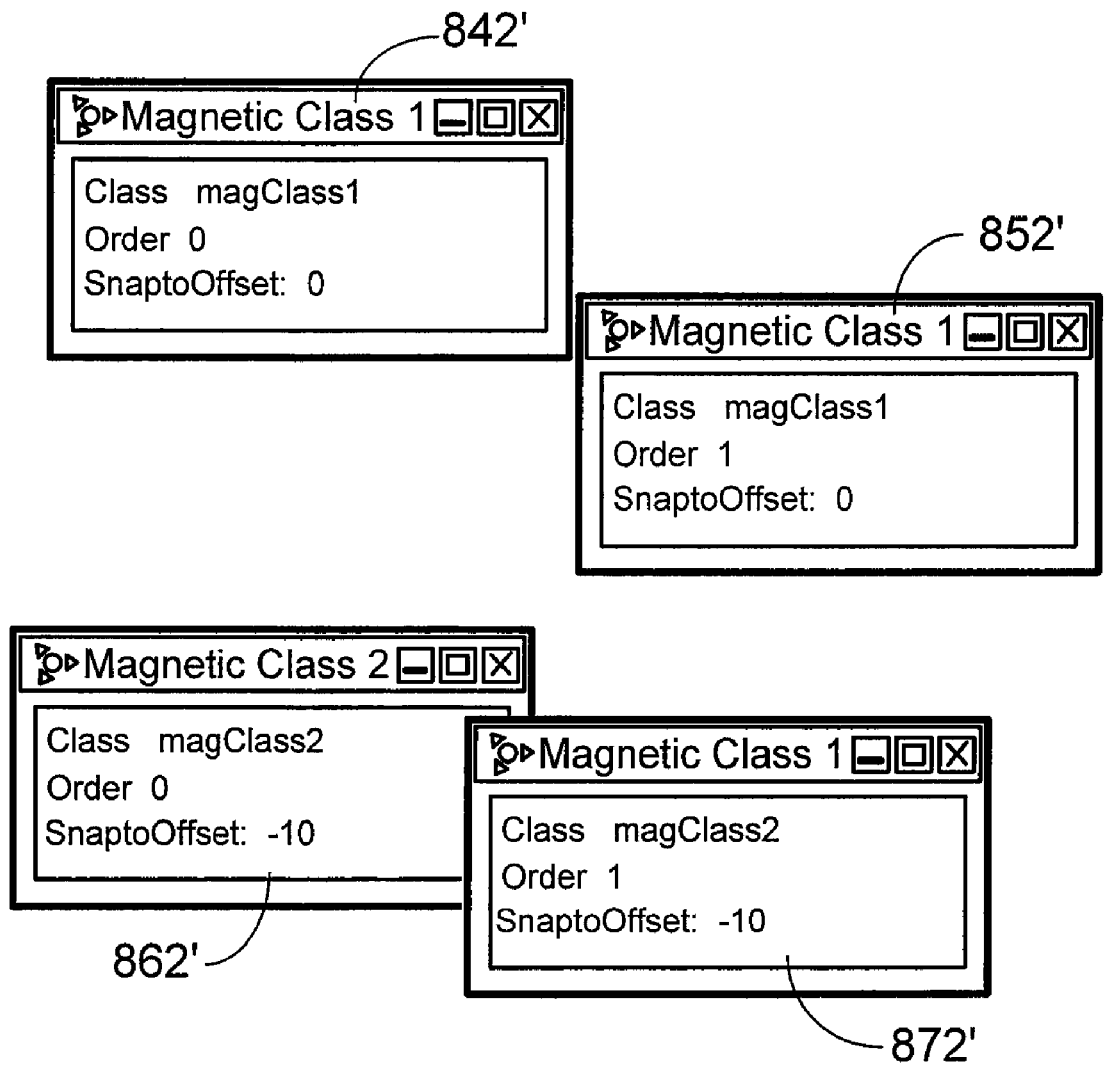
FIG. 8d(3)

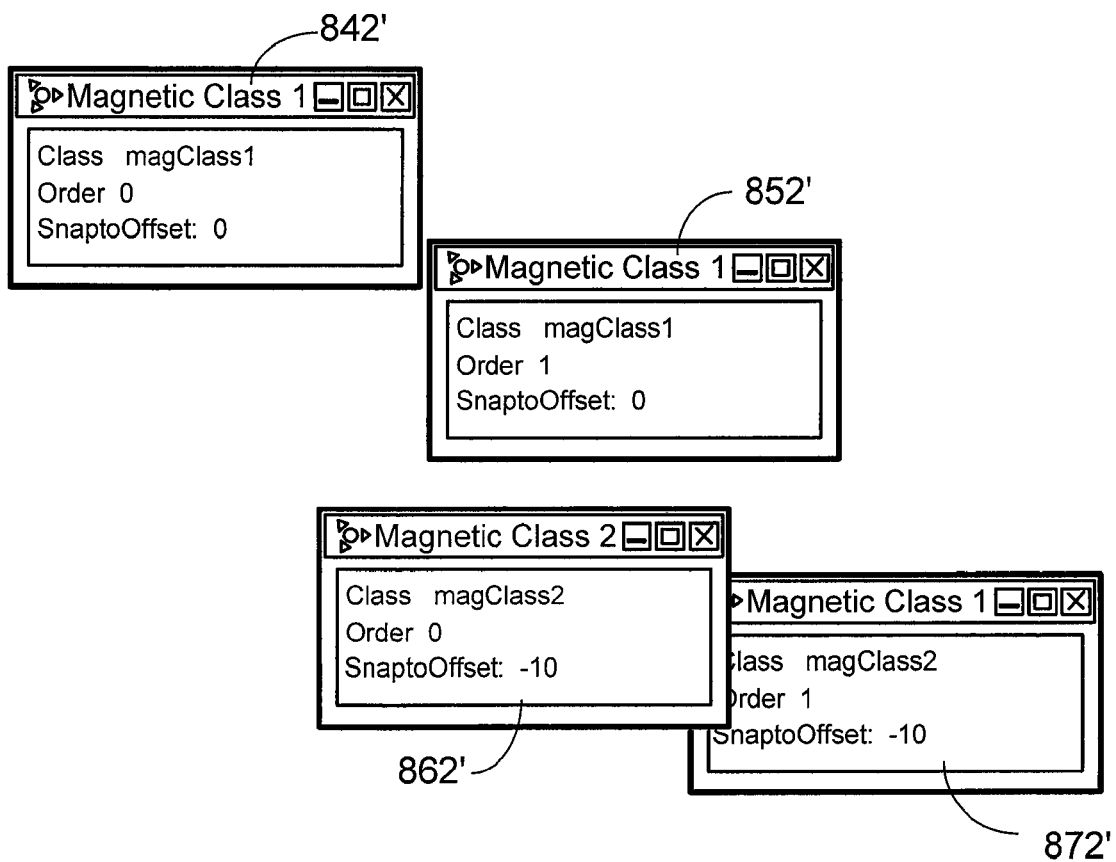
FIG. 8d(4)

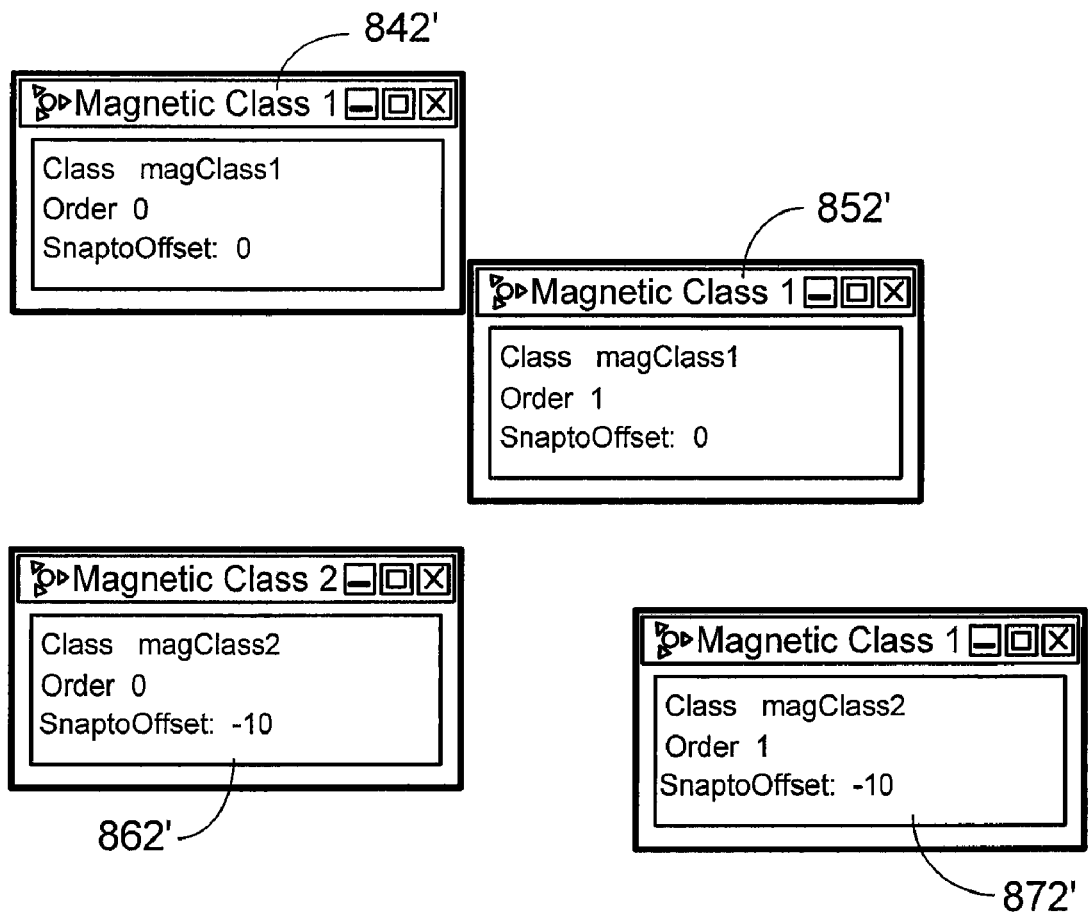
FIG. 8d(5)

USER INTERFACE WITH CONNECTABLE ELEMENTS

CROSS-REFERENCE TO RELATED APPLICATION

The present application claims priority from U.S. provisional application No. 60/674,281 filed Apr. 25, 2005, and titled "User Interface Toolkit," the entire contents of which is incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to a user interface (UI) development platform and more particularly to a UI development platform for desktop applications.

BACKGROUND

UI development platforms generally provide a framework that facilitates the development of UIs.

SUMMARY

In one aspect, a system for providing a user interface includes a first element tag and a second element tag. The first element tag specifies a first element of the user interface that is associated with a class of connectable elements and includes a first order indicator that specifies an order of the first element of the user interface within the class of connectable elements. The second element tag specifies a second element of the user interface that is associated with the class of connectable elements such that the first element of the user interface and the second element of the user interface can be connected. The second element tag includes a second order indicator that specifies an order of the second element of the user interface within the class of connectable elements. The order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved. The system also includes a parser to parse the first element tag and the second element tag, and to generate an object model based on the parsed first element tag and the parsed second element tag such that the object model includes a first element object corresponding to the first element of the user interface and a second element object corresponding to the second element of the user interface. In addition, the system includes a layout engine to determine a layout of the user interface based on the object model, and a rendering engine to render the user interface based on the determined layout.

Implementations may include one or more of the following features. For example, the first element tag may include a first class indicator that associates the first element of the user interface with the class of connectable elements. Similarly, the second element tag may include a second class indicator that associates the second element of the user interface with the class of connectable elements.

The first element tag may include an element connection distance indicator that specifies a connection distance between the first element of the user interface and the second element of the user interface such that, when the first element of the user interface is brought within the connection distance of the second element of the user interface, the first element of the user interface and the second element of the user interface are connected automatically.

The first element tag also may include a connection offset indicator that specifies a connection offset distance such that, when the first element of the user interface and the second element of the user interface are connected, the first element of the user interface and the second element of the user interface are offset by a distance equal to the connection offset distance.

In addition, the system may include a third element tag that specifies a third element of the user interface that is associated with a different class of elements such that the third element of the user interface cannot be connected to the first element of the user interface or the second element of the user interface because the first element of the user interface and the second element of the user interface both are associated with the class of connectable elements while the third element of the user interface is associated with the different class of elements.

The first element tag may include a desktop connection distance indicator that specifies a connection distance between the first element of the user interface and an edge of a desktop such that when the first element of the user interface is brought within the connection distance of the edge of the desktop, the first element of the user interface is connected to the edge of the desktop automatically.

The user interface may be a desktop application user interface.

In another aspect, a method for providing a user interface includes parsing a first element tag and parsing a second element tag. The first element tag specifies a first element of the user interface that is associated with a class of connectable elements and includes a first order indicator. The first order indicator specifies an order of the first element of the user interface within the class of connectable elements. The second element tag specifies a second element of the user interface that is associated with the class of connectable elements such that the first element of the user interface and the second element of the user interface can be connected. The second element tag includes a second order indicator that specifies an order of the second element of the user interface within the class of connectable elements. The order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved. The method also includes generating an object model based on the first element tag and the second element tag such that the object model includes a first element object corresponding to the first element of the user interface and a second element object corresponding to the second element of the user interface. In addition, the method includes determining a layout of the user interface based on the object model and rendering the user interface based on the determined layout. The method also includes connecting the first element of the user interface and the second element of the user interface, preserving the connection between the first element of the user interface and the second element of the user interface when the second element of the user interface is moved, and severing the connection between the first element of the user interface and the second element of the user interface when the first element of the user interface is moved.

Implementations may include one or more of the following features. The first element tag may include a first class indicator that associates the first element of the user interface with the class of connectable elements. Similarly, the second element tag may include a second class indicator that associates the second element of the user interface with the class of connectable elements.

The first element tag also may include an element connection distance indicator that specifies a connection distance between the first element of the user interface and the second element of the user interface such that when the first element of the user interface is brought within the connection distance of the second element of the user interface, the first element of the user interface and the second element of the user interface are connected automatically. The method also may include determining that the first element of the user interface is within the connection distance of the second element of the user interface. In addition, connecting the first element of the user interface and the second element of the user interface may include connecting the first element of the user interface and the second element of the user interface in response to determining that the first element of the user interface is within the connection distance of the second element of the user interface.

In addition, the first element tag may include a connection offset indicator that specifies a connection offset distance. Connecting the first element of the user interface and the second element of the user interface may include connecting the first element of the user interface and the second element of the user interface such that the first element of the user interface and the second element of the user interface are offset by a distance equal to the connection offset distance.

The first element tag also may include a desktop connection distance indicator that specifies a connection distance between the first element of the user interface and an edge of a desktop such that when the first element of the user interface is brought within the connection distance of the edge of the desktop, the first element of the user interface is connected to the edge of the desktop automatically. In addition, the method may include determining that the first element of the user interface is within the connection distance of the edge of the desktop, and connecting the first element of the user interface to the edge of the desktop in response to determining that the first element of the user interface is within the connection distance of the edge of the desktop.

The method also may include parsing a third element tag specifying a third element of the user interface that is associated with a different class of elements and preventing the third element of the user interface from being connected to the first element of the user interface or the second element of the user interface because the first element of the user interface and the second element of the user interface both are associated with the class of connectable elements while the third element of the user interface is associated with the different class of elements.

Implementations of the described techniques may include hardware, a method or process, or computer software on a computer-accessible medium.

The details of one or more implementations are set forth in the accompanying drawings and the description below. Other features, objects, and advantages will be apparent from the description and drawings, and from the claims.

DESCRIPTION OF DRAWINGS

FIG. 6*a* is an illustration showing a sample scene file.

FIGS. 6*b*(1)-6*b*(4), collectively, are illustrations showing a sample gadget file.

FIG. 6*c* is an illustration showing a sample behavior file.

FIG. 6*d* is an illustration showing a sample style file

FIGS. 6*e*(1)-6*e*(4), collectively, are illustrations showing a sample toolkit file.

FIGS. 6*f*(1) and 6*f*(2), collectively, are illustrations showing a sample script file.

FIGS. 6*g*(1) and 6*g*(2) are illustrations showing screenshots of a UI.

FIG. 7*a* is an illustration showing a sample scene file.

FIG. 7*b* is an illustration showing a sample script file.

FIGS. 7*c*(1)-7*c*(3) are illustrations showing screenshots of a UI.

FIG. 8*a* is an illustration showing a sample scene file.

FIGS. 8*c*(1)-8*c*(4) are illustrations showing sample children scene files.

FIGS. 8*d*(1)-8*d*(5) are illustrations showing screenshots of a UI.

DETAILED DESCRIPTION

Figure 1:
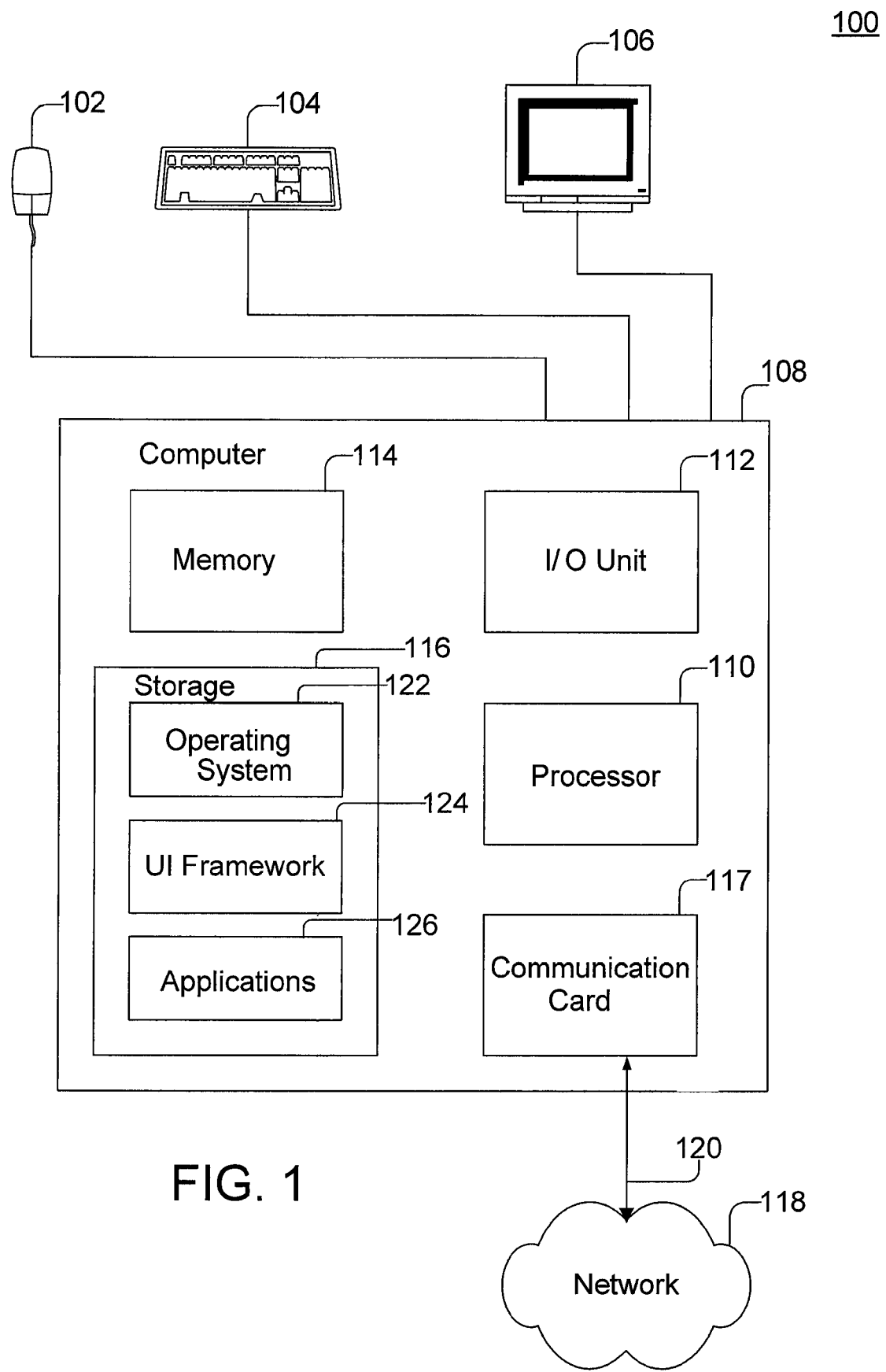
FIG. 1 is a block diagram of an example of a computing system.

FIG. 1 illustrates an example of an architecture of a computing system 100. The computing system 100 includes input/output (I/O) devices, such as mouse 102, keyboard 104, and display 106, and a central processing unit (CPU) 108. CPU 108 includes a processor 110, an I/O unit 112, memory 114, storage 116, and communications card 117 (e.g., a modem or a network adapter) for exchanging data with a network 118 via a communications link 120 (e.g., a telephone line, a wireless network link, or a cable network). System 100 may be implemented as, for example, a personal computer, a workstation, a server, a cellular telephone, or a personal digital assistant.

Storage 116 stores data and various programs such as an operating system (OS) 122. The OS 122 is a program that controls the functionality and interaction of the hardware components of the computing system 100 and that facilitates the operation of other programs executing on the CPU 108. WINDOWS ME, WINDOWS XP, LINUX, and MACOS are examples of common operating systems for personal computers. WINDOWS CE or WINDOWS EMBEDDED are examples of common embedded operating systems used in cellular telephones or personal digital assistants.

Storage 116 also stores a UI framework 124 and applications 126. The UI framework 124 is a collection of code that implements user interfaces and associated logic for applications 126 running on the CPU 108.

In general, the UI framework 124 resides between the applications 126 and the OS 122. In other words, applications 126 interact with the UI framework 124 to initiate UI functions, and then the UI framework 124 calls routines of the OS 122 to implement the initiated UI functions. A user of the computing system 100 may interact with applications 126 running on the CPU 108 through UIs by using I/O devices such as, for example, mouse 102, keyboard 104, and display 106.

The computing system 100 of FIG. 1 is merely one example of a computing system for implementing the systems, methods, and techniques described herein. Other computing systems may be used to implement these systems, methods, and techniques.

Figure 2:
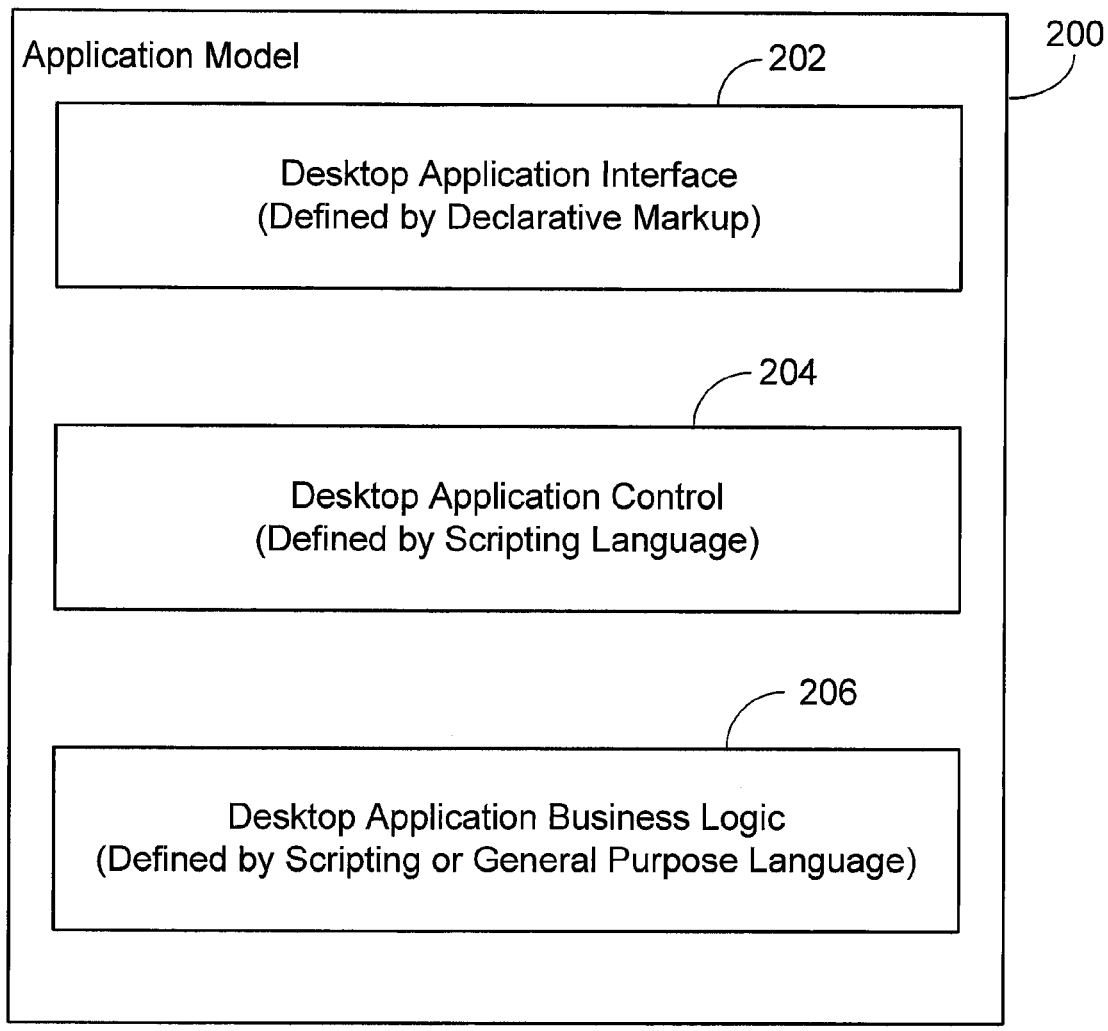
FIG. 2 is a block diagram of an example of an application model.

FIG. 2 illustrates an example of an application model 200 for a desktop application running on a CPU such as, for example, the CPU 108 of the computing system 100 of FIG. 1. The application model 200 generally follows a Model-View-Controller (MVC) pattern and includes desktop application interface 202, desktop application control 204, and desktop application business logic 206. Desktop application interface 202 is defined by declarative markup language, such as, for example, extensible markup language (XML), and provides a UI that enables a user to interact with the desktop application. Desktop application control 204 is defined by a scripting language such as, for example, JavaScript, and invokes changes to the desktop application interface 202 and the desktop application business logic 206 in response to events, such as, for example, user interactions with the desktop application interface 202. Desktop application business logic 206 holds the domain specific representation of the information on which the application operates and may be defined by a scripting language or a general purpose language.

Figure 3:
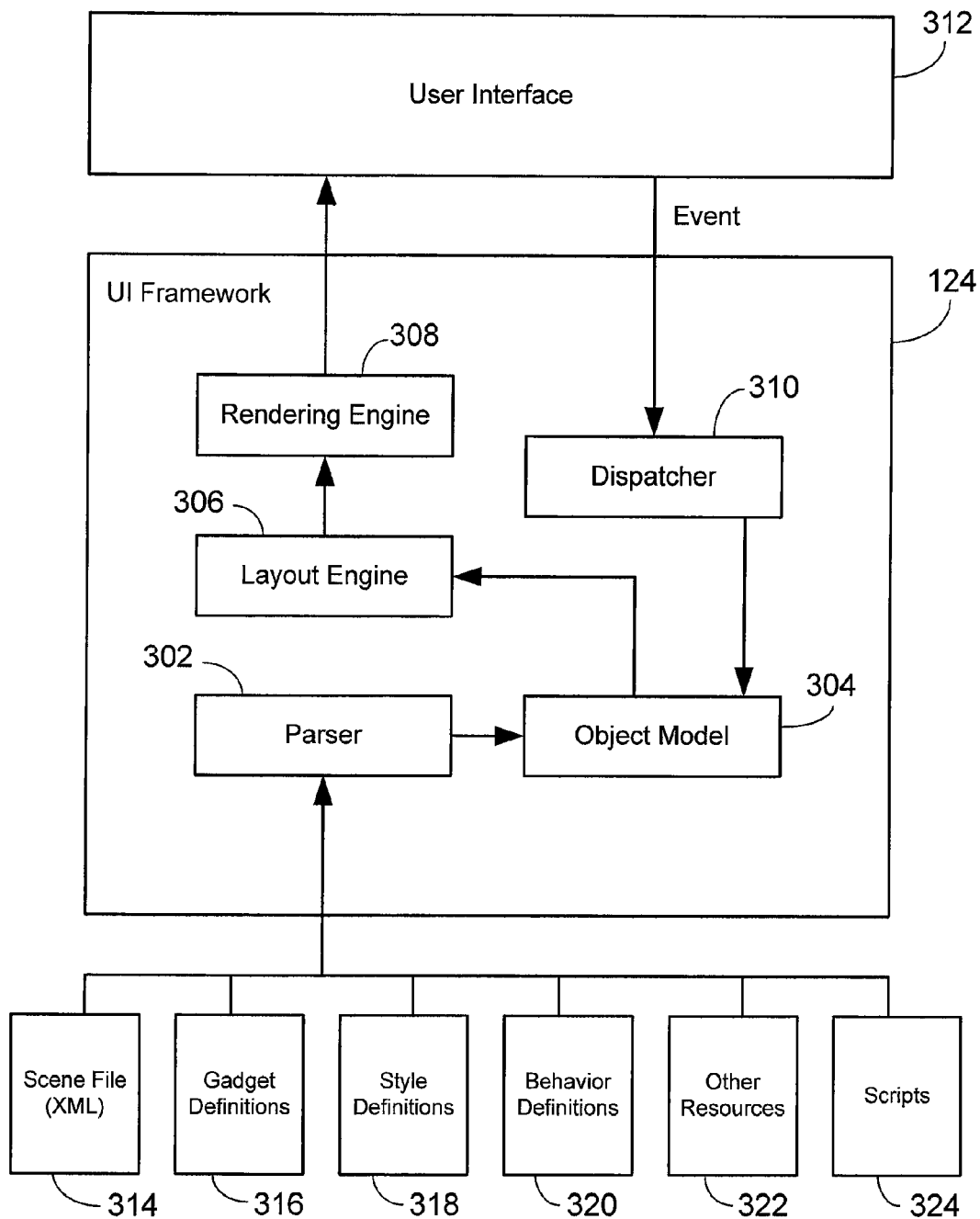
FIG. 3 is a block diagram of an example of a user interface framework.

FIG. 3 illustrates an example of a UI framework 124. UI framework 124 includes parser 302, object model 304, layout engine 306, rendering engine 308, and dispatcher 310 and provides a UI 312 in response to machine readable instructions included within scene file 314. Scene file 314 may reference one or more of gadget definitions 316, style definitions 318, behavior definitions 320, other resources 322 (e.g., animations and images), and scripts 324 for handling events (or implementing business logic). As such, the UI 312 ultimately rendered also may be based on machine readable instructions included within one or more of gadget definitions 316, style definitions 318, behavior definitions 320, other resources 322, and scripts 324.

Scene file 314, gadget definitions 316, style definitions 318, behavior definitions 320, other resources 322, and scripts 324, represent a collection of XML-based files and script files that describe the UI 312 as well as the control (and possibly business) logic underlying the UI 312. Typically, the scene file 314 presents a window on the UI 312 and executes one or more scripts 324 that implement the control layer 204 to connect the UI 312 with application logic, which may be defined in the scripts 324 or in binary files (not shown).

A scene file 314 generally includes three principal types of objects: boxes, resources, and scripts. Boxes are the basic building blocks of a scene file 314. As a result, a typical scene file 314 may include a rooted hierarchy of boxes that describe rectangles to be rendered in the UI 312 on the display 106 and whose appearance and behavior may be controlled. Often, a root box in a scene file 314 represents a window on the UI 312 while the children boxes represent other features such as, for example, interactive controls, images, and text. Each box within a scene file 314 may be arranged, styled, and animated in a wide variety of ways using resources and scripts made available in gadget definitions 316, style definitions 318, behavior definitions 320, other resources 322, and scripts 324.

Resources made available in the gadget definitions 316, style definitions, behavior definitions 320, and other resources 322 allow developers to control the style, appearance, and behavior of boxes. In general, a resource is an object that describes one or more items that may be shared by any number of boxes concurrently. Available resources include, for example, gadgets, attributes, style definitions/visual styles, behaviors, animations, bitmaps, gradients, shapes, event handlers, and tag definitions. Resources may be bundled into libraries that are loaded into memory once and subsequently shared by one or more scene files. For example, gadget definitions 316, style definitions 318, behavior definitions 320, and other resources 322 may represent individual files, each including individual libraries that may be stored separately in memory. Additionally, or alternatively, one or more of gadget definitions 316, style definitions 318, behavior definitions 320, and other resources 322 may be defined and/or included in a library within the scene file 314, or any other file referenced by the scene file 314 and accessible by the UI framework 124.

Gadget definitions 316 include one or more gadget definitions written in XML-based markup language. A gadget is a reusable, packaged (e.g., atomic) component built by compositing one or more elemental boxes and/or other gadgets. In some instances, gadgets also reference script logic. A gadget may be considered an atomic unit because once a gadget has been defined, it may be referenced simply by its gadget tag (e.g., <gadget id> where "gadget id" represents the value assigned to the "id" attribute of the gadget in the gadget definition). Gadget definitions generally are located in libraries. For example, a gadget definition may be located in a library within a gadget file or in a local library in the scene file 314. The gadget definitions 316 may include a collection of predefined, stock gadgets. Additionally or alternatively, a developer may create his/her own gadgets from scratch or by extending and/or combining predefined, stock gadgets and/or boxes. In some respects, gadgets may be considered as analogous to prefabricated construction supplies in that gadgets represent pre-built, reusable modules that not only may facilitate scene development, but also may allow developers to maintain a consistent look, feel, and behavior. Examples of typical gadgets include, but are not limited to, boxes, tabs, toolbars, buttons, textboxes, and sliders.

Style definitions 318 include one or more style definitions written in XML-based markup language. A style definition is a reusable collection of one or more attributes that define the visual appearance of boxes and/or other elements provided in the UI 312. Style definitions may be shared by one or more boxes. Style definitions generally are located in libraries. For example, a style definition may be located in a library within a "styles" file or in a local library in the scene file 314.

Behavior definitions 320 include one or more behaviors that define a group of reactions that may be shared by one or more boxes or gadgets. Behavior definitions 320 are written in an XML-based markup language and include associated script. Behavior definitions 320 may include a set of pre-defined, default behaviors. Additionally or alternatively, a developer may create his/her own behaviors from scratch or by extending predefined, default behaviors to create even more complex sets of behaviors. Behavior definitions generally are located in libraries. For example, a behavior definition may be located in a library within a "behaviors" file or in a local library in the scene file 314.

Scripts 324 include a collection of named functions that may be called in response to one or more events to update interface 202 or business logic 206. Scripts 324 also may include functions that implement business logic 206. Events may be dispatched in response to a number of different triggers such as, for example, scene startup and various forms of user interaction. Scripts 324 are written in a scripting language such as, for example, JavaScript.

Figure 4:
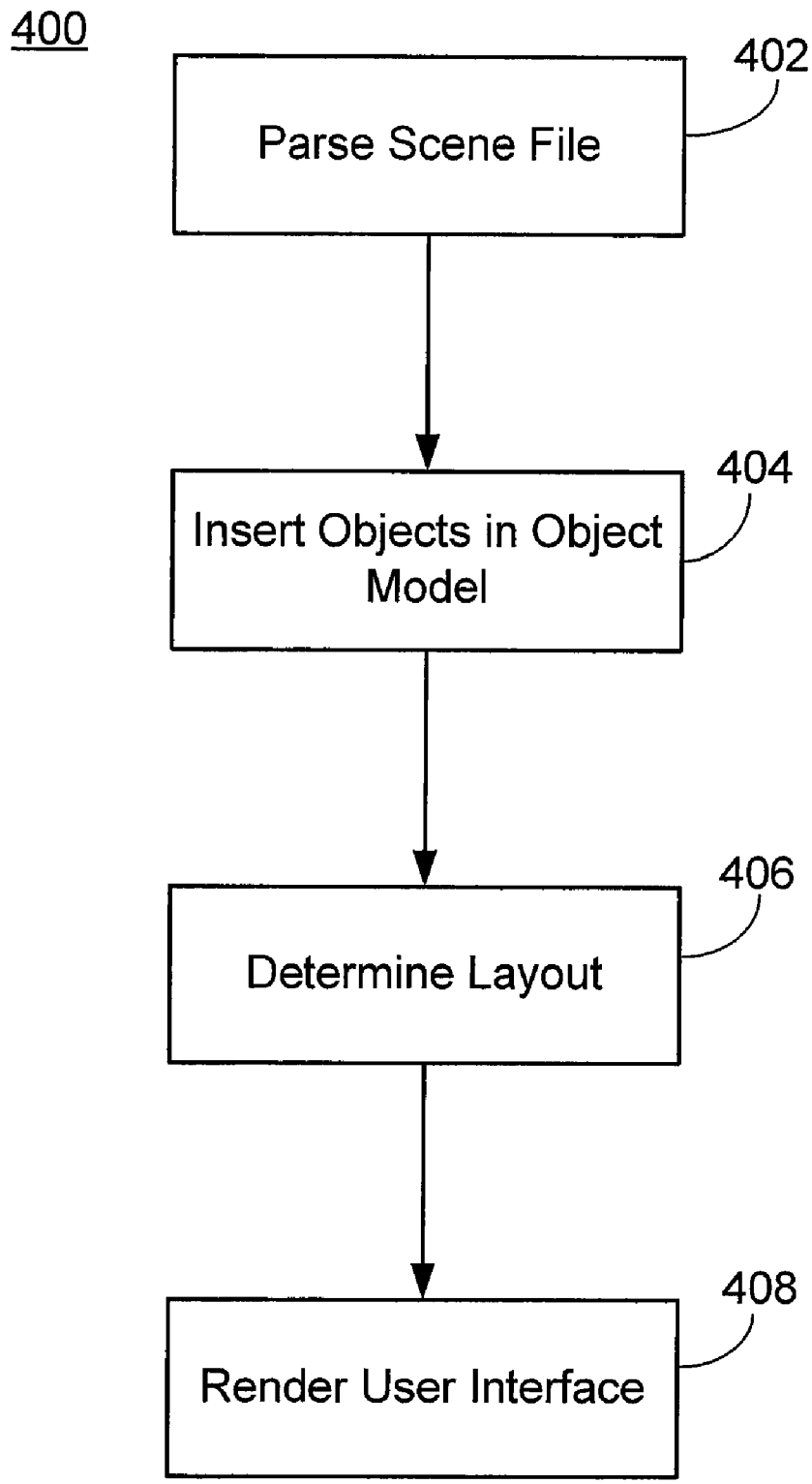
FIG. 4 is a flow chart of an example of a process for generating a UI.

Referring to FIG. 4, an example of a process 400 by which the UI framework 124 generates the UI 312 based on scene file 314 and referenced gadget definitions 316, style definitions 318, behavior definitions 318, other resources 322, and scripts 324 is described. Generally, the process 400 for generating the UI 312 includes parsing the scene file 314, inserting objects in the object model 304 based on the parsed scene file 314, determining the layout of the UI 312 based on the object model 304, and rendering the UI 312.

More particularly, parser 302 parses each XML-based tag in scene file 314 (402), creates a corresponding object for the XML-based tag, and inserts the object in the appropriate place in the object model 304 (404). As part of parsing the scene file 314, the parser 302 may import one or more libraries including one or more gadget definitions 316, one or more style definitions 318, and/or one or more behavior definitions 320 and associated scripts 324 and other resources 322 by default. For example, the parser 302 may import definitions for stock gadgets, styles, and/or behaviors and their associated scripts 324 and other resources 322 by default.

In addition, the parser 302 may import one or more gadget definitions 316, one or more style definitions 318, and/or one or more behavior definitions 320 and associated scripts and resources 322 that are included in files referenced by the scene file 314 or any files defining the stock gadgets, styles, or behaviors. For example, a file may be referenced by the scene file by using an <import> tag (i.e., <?import href="box://path/to/file"?>). When the parser 302 parses an <import> tag, the parser 302 reads the file at the specified uniform resource locator (URL), which is expected to contain a library. Once the library has been parsed, it is kept in memory and shared by all scenes that include it. Additionally, or alternatively, the scene file 314 may include a local library.

After the object model 304 is complete, the layout engine 306 determines the layout of the UI 312 based on the object model 304 (406). The rendering engine 308 then uses the determined layout of the UI 312 to render the UI 312 on the display 102 (408) by, for example, calling functions of OS 122.

Figure 5:
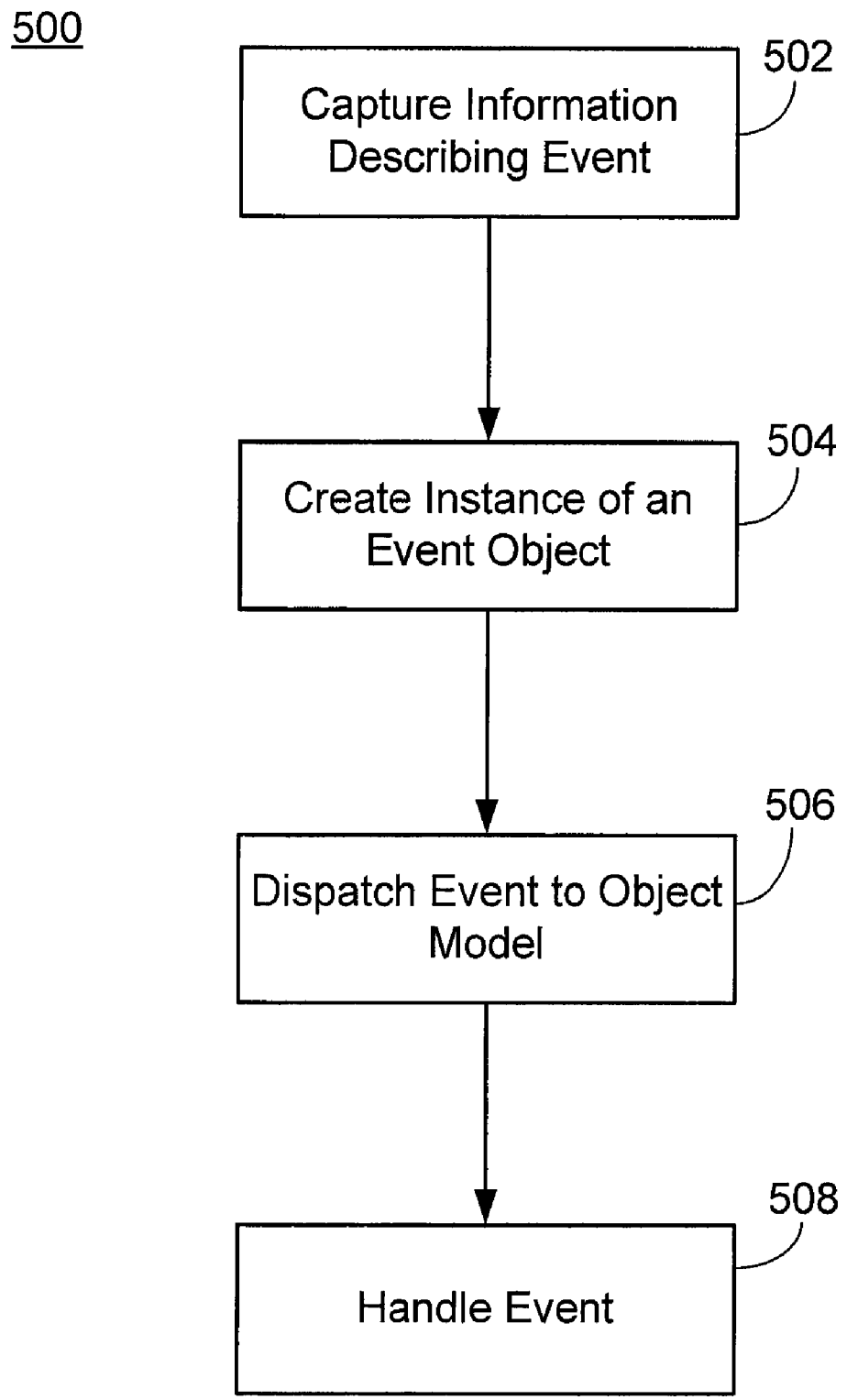
FIG. 5 is a flow chart of an example of a process for detecting and handling an event.

After the UI 312 has been generated, the UI framework 124 supports responding to certain actions such as, for example, the initialization of a scene or movement of the mouse 102. Information about these actions is captured into objects known as "events," which are then dispatched to objects in the object model 304 that are interested in the event. Referring to FIG. 5, an example of a process 500 by which the UI framework 500 handles events is described. Generally, the process 500 for handling events includes capturing information describing an event, creating an instance of an event object, dispatching the event to the object model 304, and handling the event.

More particularly, when an event occurs, the UI framework 124 captures information describing the event (502) and creates and initializes an instance of an event object that includes the information describing the event (504). For example, a mouse event object may include the coordinates of the mouse, the box or gadget that the mouse was over, the mouse button that was clicked, and the state of the shift key at the time of the event. Each event may be identified by a "type" string such as, for example, "mouseDown." In addition, each event may be credited to a single box or gadget (i.e., the box from which the event emanated) referred to, for example, as the "target" box.

After an instance of an event object is created, the dispatcher 310 dispatches the instance of the event to the object model 304 (506), where it is handled (508). Events are handled by event listener objects that are attached to boxes or gadgets in the UI 312 (and, hence, their corresponding objects in the object model 304). Event listeners may be attached to a box or gadget by adding an attribute to the box or gadget, or by adding a "reaction" as a child of the box or gadget. For example, the syntax for attaching an event listener to a box or gadget by specifying the event as an attribute of the box or gadget may take the form <box on:event="gadget.on Event( );"/> where "box" represents the target box, "on:event" represents the event to be listened for, and ""gadget.on Event( );"" represents a function to be called in response to the event as well as the location of the function to be called in response to the event. The syntax for attaching an event listener to a box or gadget by adding a reaction child to a box or gadget may take the form <reaction event="event" action="toolkit:on Event"/> where "event="event"" represents the event to be listened for, and "action="toolkit:on Event"" represents the function to be called in response to the event and the location of the function to be called in response to the event. Additionally, or alternatively, event listeners may be attached to a box or gadget by associating a behavior with the box or gadget.

As discussed above, an event listener is associated with one or more call back scripts that are written in a scripting language such as, for example, JavaScript. The call back scripts represent functions that are called when an event corresponding to the event listener is dispatched to the box or gadget. Thus, boxes or gadgets may maintain a list of event listener objects that "listen" for events. When an event object is dispatched to a box or gadget, the event object may allow each event listener attached to the box or gadget the chance to handle the event. In some implementations, an event dispatch occurs in several phases. In such implementations, the first item to handle an event may be the scene (which is the root box that corresponds to the window of UI 312), which may include its own set of listeners. If a scene includes event listeners, every event that happens to any box in the scene may be handled in the scene. After the scene handles an event, the target box may handle the event. Finally, after the target box handles the event, the propagation phase may begin. During the propagation phase, the event may recursively propagate up the root tree of the box hierarchy such that the event object propagates from one parent box to the next. As such, the propagation phase may allow events that happen to an entire sub-tree to be handled. Alternatively, the propagation of the event may be stopped after the event has been handled. That is to say, after an event has been handled, it need not propagate through the entire tree.

Referring again to FIG. 3, scene file 314, gadget definitions 316, style definitions 318, and behavior definitions 318 now will be described in more detail. As discussed above, boxes are the basic building blocks of a scene file 314. Boxes may inherit their properties (e.g., attributes, states, and styles) from one of several base box types. An instance of a box may be specified in XML in a scene file 314 by using a box tag. Additionally, or alternatively, a box may be created and inserted into a scene via script. The base boxes may be extended to create complex UIs from simple building blocks by compositing basic boxes and by adding behaviors and animations through, for example, XML and JavaScript. For example, a broad variety of UI elements, including, but not limited to, buttons, list boxes, images, text editors, electronic mail clients, and instant messaging clients may be built by compositing, styling, animating, and controlling base boxes.

Box tags may include attributes, styles and states. Attributes may be used to configure boxes. Attributes may be predefined within the UI framework 124 or a developer may create and add attributes to the UI framework 124 using non-reserved names. Attributes for a box may be declared in markup within the box tag. Additionally, or alternatively, attributes for a box may be read and set from script. Specifying the "id" attribute for a box allows the box to be referred to elsewhere in the markup or the script. That is to say, the "id" attribute for a box sets a name for the box that can be used to refer to the box in order to, for example, apply styles, behaviors, or animations to the box. Another example of an attribute that may be specified for a box is a "type" attribute. The type attribute defines the base type of a box. For example, specifying type="control" indicates that the box is a control type box.

Styles are a subset of attributes that reside in a "style" namespace and that control the visual appearance of boxes. Like attributes, styles for a box may be declared in markup. In particular, styles may be declared for a particular box within the box's tag. Additionally, or alternatively, styles may be bundled together into style definitions and applied to one or more boxes concurrently. Styles also may be read and set from script. Examples of style attributes include, but are not limited to, "s:height", "s:width", and "s:fill". Specifying the "s:height" style attribute for a box allows the height of the box to be set. Specifying the "s:width" style attribute for a box allows the width of the box to be set. Specifying the "s:fill" style attribute for a box allows the fill color of the box to be set.

States are a list of values that represent Boolean properties for boxes that allow different attributes and styles to be applied to a box as the box enters and exits different states. If states and attributes and/or styles are specified for a box, when the box enters a particular state, the box's attribute and/or style is automatically updated with the attribute and/or style specified for the state. Additionally, or alternatively, and as discussed in greater detail below, an animation may be triggered by a state change such that the transition to the new value of the attribute and/or style is animated.

The UI framework 124 may support many types of states, including, for example, "hidden" (specifies whether the box should be painted in its allocated space), "collapsed" (specifies whether the box should be allowed to take up any space in the layout), "deflated" (specifies whether all of the box's children are collapsed), "overflowed" (specifies whether the descendants of the box are too large to fit within the box), "hovered" (specifies whether the mouse is directly over the box), "pressed" (specifies whether the left mouse button is held down directly over the box), "dragged" (specifies whether the box was dragged to begin the current drag and drop operation), "draghovered" (specifies that the mouse is directly over the box during the current drag and drop operation and that the box is able to accept the data if dropped), "focused" (specifies that the box is currently focused as the target of all keyboard events), "disabled" (specifies that the box is disabled, and cannot be the target of mouse and keyboard events), "engaged" (specifies that the box is able to perform its primary function), "popped" (specifies that the box is the target of a currently opened pop-up window), "expanded" (specifies that a list of data is bound to the box, and the box has been expanded to display the list), "isContainer" (specifies that a list of data is bound to the box), and "isItem" (specifies that the box is an item in a list of bound data). States for a box may be declared in markup as a child of the box tag and/or they may be read and set from script. For example, the syntax for specifying an attribute and/or style to be changed in response to a state change may take the form <state name="stateName" attribute/style="newValue"> where "name="stateName"" represents the state and "attribute/style="newValue"" represents the style or attribute to be changed. Alternatively, "attribute/style="newValue"" may represent the value of a change that is to be applied to the attribute or style in response to the state change. For example, if the style to be changed is the fill color of the box, "attribute/style" may specify a value to add to or subtract from the value of the fill color of the box before the state change.

The UI framework 124 may support several base box types including, for example, box, image, control, range, text, and window boxes.

A box type box may be used for a wide variety of reasons, including, for example, as a container for other boxes or for layout purposes. An instance of a box type box may be specified using the <box> tag hbox and vbox box types represent variants of the box type box that may be specified using the <hbox> and <vbox> tags respectively. The hbox and vbox boxes are like the box type box except that the hbox and vbox types include orientation information. In particular, an hbox type box orients children elements (e.g., boxes) declared within the <hbox> tag horizontally whereas a vbox type box orients children elements (e.g., boxes) declared within the <vbox> tag vertically.

An image box includes an image identified by a "src" attribute and may function much like an hypertext markup language (HTML)<img src=" "/> tag. An instance of an image box may be specified using the <image> tag. An image may be inserted in an image box using the "src" attribute which may be specified as an http://address or a box://address. Box addresses are a way to refer to other objects located in a common directory.

A control is a box that may be toggled on and off. As such, a control box may be considered to work similarly to an HTML radio button or check box. An instance of a control box may be specified using the <control> tag. Various attributes may be applied to a control box including, for example, "label,", "selected", "toggled", "tristate", and "value".

A range box is an extension of the control box type. However, instead of having a Boolean value, a range box may return values within a range. For example, a range box may be used to pass back various values of a slider (e.g., a sliding bar that increases or decreases an option in a menu). An instance of a range box may be specified using the <range> tag.

A text box type box allows text within the box to be formatted using attributes and styles such as, for example, "word wrap", "clipping", "fonts", and "styles". An instance of a text box may be specified using the <text> tag.

A window box represents a native window in the OS environment and typically represents a root level box in a UI.

To construct a more interesting and useful UI component, base boxes may be styled and combined into a gadget. A gadget is a reusable, atomic component built by compositing one or more boxes and/or other gadgets. In addition to including a combination of one or more boxes and/or other gadgets, a gadget also may include script logic.

Gadget definitions typically are located within a library. A gadget definition creates an object in the object model 304 such that an instance of the gadget may be instantiated by specifying the <gadget> tag. Attributes associated with the root <gadget> tag include, for example, "id", "type", "inherits", "script", and "language."

The "id" attribute of a gadget represents the universal identifier of the gadget that may be referenced in a scene. For example, if the "id" attribute for a gadget is specified as "myGadget" in a gadget definition (i.e., <gadget id="myGadget" . . . />), the gadget may be instantiated by using the <myGadget> tag.

The "type" attribute of a gadget represents the base type of box that the gadget derives from. If a gadget does not have specific attributes or behaviors associated with it, it may revert to the default attributes and behaviors of its base type. Acceptable values for the "type" attribute of a gadget may include, for example, basic, image, control, range, text, and window.

Gadgets may inherit one or more attributes, parts, and/or behaviors from other boxes and/or objects. The "inherits" attribute is used in the root of a gadget definition to specify that a gadget will inherit one or more attributes, parts, and/or behaviors from other boxes and/or objects. That is to say, specifying an "inherits" attribute in the root of a gadget definition causes the gadget to inherit the default attribute values, parts, and behaviors of the specified gadget. The ability to inherit attributes, parts, and/or behaviors may allow a new gadget to be created based on an old gadget.

If the "inherits" attribute is specified for a part of a gadget in a gadget definition (described below), when the gadget is instantiated, the part of the gadget will inherit the attribute, part, or behavior from the parent gadget. For example, if inherits="src=imageUrl" is specified for an image box that forms part of a gadget, the image box part of the gadget will inherit the attribute "imageUrl" from the instance of the gadget in the scene. The "inherits" attribute may follow the convention inherits="targetAttribute=sourceAttribute" which may be shortened to inherits="foo" in the event that inherits="foo=foo". When a style is to be inherited, it may be necessary to add a "$" before the style attribute to signify the style namespace (e.g., inherits="$fontColor").

A gadget may call a script in response to an event. The "language" and "script" attributes of the gadget definition root are used to associate the gadget with a script (e.g., <gadget id="gadgetWithScript" language="jscript" script="box://path/to/scriptjs"/>). After a script file has been associated with the gadget, the script then may be referenced from within the gadget definition. Gadget scripts may run in their own separate namespace and therefore may be set apart using their own scripting prefix "gadget:".

In addition to attributes associated with the gadget definition root, gadget definitions may include children, such as, for example, an attributes child, a parts child, and a behaviors child.

Attributes declared for a gadget within an attributes child of a gadget definition represent a default set of attributes and values for the gadget. As discussed above, gadgets typically are based on a base type of box. By explicitly specifying attributes for a gadget in an attribute child of the gadget definition, any attributes that otherwise would have been inherited from the base type of box may be overridden. Attributes specified in an attribute child in a gadget definition represent default attributes that may be supplemented or overridden by attributes that are declared in conjunction with an instantiation of the gadget.

Parts declared for a gadget within a parts child of a gadget definition represent one or more discrete pieces that have been composited together to build the gadget element. For example, a part of a gadget may be a base box or another gadget.

Behaviors declared for a gadget within a behaviors child in a gadget definition specify default reactions for specified events and/or states. Behaviors may be declared for the gadget explicitly within a behavior child of the gadget definition. Additionally or alternatively, and as discussed more fully below, behaviors may be inherited from a behavior definition using the syntax <behavior inherits="box://path/to/behavior.box#id"> where #id denotes the id of the behavior to be inherited.

Styles may be applied to boxes or gadgets in many different ways. For instance, styles may be applied directly to an instance of a box or gadget by specifying the styles as attributes in the box or gadget tag (e.g., <box s:fill="green"/>). Alternatively, a style definition including one or more styles may be defined within a library and given an "id" such that the style definition's "id" may be referenced via a style attribute. The following snippet of markup provides an example:

```
<library >
    <style id="myStyle"
        fontSize="11"
        margin="0 0 0 0"
        padding="2 15 0 15"
    </style>
</library>
<box id="myBox" style="myStyle"/>
```

In the above example, the styles declared in the "myStyle" style definition are applied to the "myBox" box by referencing the "myStyle" id as a style attribute in the <box> tag. Styles also may be applied to a box or gadget by using a tag selector to associate a style definition with a box or gadget tag that exists in the object model 304. The following snippet of markup provides an example:

```
<library>
    <style tag="myBox"
        fontSize="11"
        margin="0 0 0 0"
        padding="2 15 0 15"
    </style>
</library>
<myBox />
```

In the above example, the styles declared in the style definition are applied to the "myBox" gadget because the tag selector in the style definition associates the style definition with the <myBox> tag. A fourth way that styles may be applied to a box or gadget is to specify an "id" for a style definition in a library and then to assign a box or gadget the same "id." The following snippet of markup provides an example:

```
<library>
    <style id="myStyle"
        fontSize="11"
        margin="0 0 0 0"
        padding="2 15 0 15"
    </style>
</library>
<box id="myStyle" />
```

In the above example, the styles declared in the "myStyle" style definition are applied to the box because "myStyle" is specified as the "id" attribute for both the style definition and the <box> tag.

In the event that conflicting styles are assigned to a box or gadget using the techniques for assigning styles described above, a hierarchy may be relied on to resolve any conflicts. For example, the following hierarchy may be used to resolve conflicting style assignments: (1) a style that is assigned to a box or gadget by specifying the style as an attribute within the box or gadget tag; (2) a style that is assigned to a box or gadget by specifying the same "id" attribute for the box or gadget tag as the style definition; (3) a style that is assigned to a box or gadget by specifying the style "id" as a style attribute within the box or gadget tag; and (4) a style that is assigned to a box or gadget by using a tag selector to associate the style definition with a tag.

As discussed above, a behavior definition is a resource that defines a group of reactions that can be shared by one or more boxes. In particular, a behavior definition specifies a collection of one or more events and references the scripts that implement the reactions to the events. As such, several event listeners may be attached to a box in the scene file 314 simply by referencing a particular behavior definition. Typically a behavior definition may be referenced by the "id" specified for the behavior definition. For example, the syntax for declaring a behavior definition may take the form:

```
<behavior id="behaviorName">
    <reaction.../>
    <reaction.../>
</behavior>
``` where "id="behaviorName"" represents the "id" specified for the behavior and the <reaction> tags represent the reactions constituting the behavior definitions.

FIGS. 6a, 6b(1)-6b(4), 6c, 6d, 6e(1)-6e(4), 6f(1), 6f(2), 6g(1) and 6g(2) illustrate an example of how a scene file, gadget definitions, behavior definitions, style definitions, scripts, and other resources may be used to describe a UI and the logic behind the UI. In particular, FIG. 6a is an example of a scene file; FIGS. 6b(1)-6b(4) collectively represent an example of a gadget file having a library including gadget definitions; FIG. 6c represents an example of a behavior file having a library including behavior definitions; FIG. 6d is a sample of a style file having a library including style definitions; FIGS. 6e(1)-6e(4) collectively represent a toolkit file having a library including style definitions; FIGS. 6f(1) and 6f(2) collectively represent a JavaScript file including script functions; and FIGS. 6g(1) and 6g(2) illustrate the UI described by the scene file, gadget definitions, behavior definitions, style definitions, scripts, and other resources.

It will be appreciated that the examples of the scene file, gadget definitions, behavior definitions, style definitions, scripts, and other resources presented in FIGS. 6a, 6b(1)-6b(4), 6c, 6d, 6e(1)-6e(4), 6f(1), and 6f(2), may not represent fully functioning code capable of fully describing the UI illustrated in FIGS. 6g(1) and 6g(2). Rather, the examples of the scene file, gadget definitions, behavior definitions, style definitions, scripts, and other resources presented in FIGS. 6a, 6b(1)-6b(4), 6c, 6d, 6e(1)-6e(4), 6f(1), and 6f(2) are presented merely for the purposes of illustrating how a scene file, style definitions, behavior definitions, gadget definitions, other resources, and scripts may be tied together to describe a UI. Indeed, for the purposes of illustration and the sake of clarity, certain gadget definitions, behavior definitions, style definitions, scripts, and other resources intentionally may have been omitted from the examples of the scene file, gadget definitions, behavior definitions, style definitions, scripts, and scripts presented in FIGS. 6a, 6b(1)-6b(4), 6c, 6d, 6e(1)-6e(4), 6f(1), and 6f(2). Similarly, portions of other examples of files and code referred to herein and illustrated in other FIGS. also may have been omitted for the purposes of illustration and the sake of clarity.

Referring to FIG. 6a, an example of a scene file 6000 describing a UI is illustrated. Scene file 6000 is an XML document that includes an XML declaration 6002, an <import> tag 6004, and an "aolWindow" gadget element 6006.

The XML declaration 6002 labels the scene file 6000 as an XML file and specifies the XML version and the character encoding of the text within the scene file 6000 to the parser 302. In one implementation, upon parsing the scene file 6000, the parser 302 automatically loads a gadgets definition file including gadget definitions, a behaviors file including behavior definitions, and a styles file including style definitions. The gadgets file will be described in greater detail with respect to FIGS. 6b(1)-6b(4); the behaviors file will be described in greater detail with respect to FIG. 6c; and the styles file will be described in greater detail with respect to FIG. 6d. In addition, the <import> tag 6004 links the scene file 6000 to a toolkit file that includes style definitions. The syntax of the <import> node 6004 instructs the parser to parse the file located at the URL box://boxelyToolkit/theme/toolkit.box. The toolkit file applies styles to the gadgets (and their parts) in the scene file 6000. An example of a toolkit file is described below with respect to FIGS. 6e(1)-6e(4).

The "aolWindow" element 6006 is a gadget element. As discussed above, a gadget is a reusable element that may include a base set of attributes, a base set of children elements, and/or a base set of behaviors. Gadgets may be defined in a library. For example, gadgets may be defined in a local library within the a scene file itself, or gadgets may be defined in libraries within other files that are referenced by the scene file. The gadget definition for the "aolWindow" gadget is located within a separate gadgets file that is automatically loaded by the parser 302 upon parsing the scene file 6000. The separate gadgets file is discussed in greater detail below in connection with in FIGS. 6b(1)-6b(4).

The "aolWindow" gadget element 6006 instantiated in the scene file 6000 declares three XML namespaces, http://www.aol.com/boxely/box.xsd, http://www.aol.com/boxely/style.xsd, and http://www.aol.com/boxley/reaction.xsd, and specifies several supplemental attributes in addition to the base attributes specified in the "aolWindow" gadget definition. These additional attributes include, for example, id="window", translucent="false", chromeless="true", s:width="500", s:height="150", title="progress bar", on:presented="on Presented( );", and on:destroyed="on SceneClose( );". The id="window", translucent="false", chromeless="true" and title="progress bar" attributes represent generic attributes whereas the s:width="500", s:height="150" attributes represent style attributes defined in the style namespace. The on:presented="on Presented( );", and on:destroyed="on SceneClose( );" attributes represent reactions specified as attributes of the "aolWindow" gadget.

The "aolWindow" gadget element 6006 also includes several children elements in addition to the base parts specified in the "aolWindow" gadget definition that will be described in greater detail below in connection with FIGS. 6b(1)-6b(4). As a result, the "aolWindow" gadget element 6006 serves as a container (e.g., window) for holding the children elements specified within the "aolWindow" gadget tag. In particular, the "aolWindow" gadget element 6006 includes a child "vbox" element 6008, that itself includes a nested hierarchy of additional elements. The "vbox" element 6008 is a parent element including a first child "aolLabel" gadget element 6010, a child "hbox" element 6012, a child "aolSlider" gadget element 6014, and a second child "aolLabel" gadget element 6016. The "hbox" element 6012 also is a parent element including a child "aolProgressBar" gadget element 6018.

While the "vbox" parent element 6008 and the "hbox" child element 6012 represent base boxes supported by the UI framework 124, the first and second "aolLabel" elements 6010 and 6016, the "aolProgressBar" element 6012, and the "aolSlider" element 6014 all represent gadget elements that are defined in the gadgets file discussed in greater detail below in connection with FIGS. 6b(1)-6b(4).

The UI framework 124 supports data binding, thereby enabling the creation of a relationship between a scene element (e.g., a box or a gadget) and a data source. A box or gadget that is "data bound" is a UI element having one or more properties that are directly bound to one or more properties of a data source. After a data binding relationship has been established between a UI element and a data source, any data changes in the data source may be reflected in the UI. Similarly, any changes in the UI may be replicated back to the data source.

Data binding is accomplished by using a <binding> tag having an "elementSource" attribute to bind one or more attributes or styles of a box or gadget to one or more attributes or styles of another box or gadget. This functionality may be useful, for example, for updating the state of one element based on the state of another element.

As illustrated in FIG. 6a, "aolLabel" gadget element 6010 has a child <binding> tag 6020, "aolProgressBar" gadget element 6018 has a child <binding> tag 6022, and "aolLabel" gadget element 6016 has a child <binding> tag 6024.

Taking the child <binding> tag 6022 of the "aolProgressBar" gadget element 6018 as an example, the child <binding> tag 6022 binds the "aolProgressBar" gadget element 6018 to the "aolSlider" gadget element 6014. The child <binding> tag 6022 of the "aolProgressBar" gadget element 6018 includes an "elementSource" attribute, a "targetProperty" attribute, a "path" attribute and a "method" attribute. The "elementSource" attribute of the child <binding> tag 6022 specifies the "id" of the "aolSlider" gadget element 6014 as the data source to which the "aolProgressBar" gadget element 6018 is bound. The "targetProperty" attribute of the child <binding> tag 6022 specifies that the "value" attribute of the "aolProgressBar" gadget element 6018 is the target of the data binding with the "aolSlider" gadget element 6014. The "path" attribute of the child <binding> tag 6022 specifies the target attribute of the data source, in this case the value attribute of the "aolSlider" gadget element 6014. Finally, the "method" attribute of the child <binding> tag 6022 specifies whether the data binding between the "aolProgressBar" gadget element 6018 and the "aolSlider" gadget element 6014 is unidirectional or bi-directional. Because the "method" attribute specifies "twoWay," the data binding is bi-directional. In other words, modifications to the "value" attribute of the "aolSlider" gadget element 6014 will be replicated in the "value" attribute of the "aolProgressBar" gadget element 6018 and vice versa. Thus, whenever the "value" attribute of the "aolSlider" gadget element 6014 is incremented, the "value" attribute of the "aolProgressBar" gadget element 6018 is correspondingly incremented, and whenever the "value" attribute of the "aolSlider" gadget element 6014 is decremented, the "aolProgressBar" gadget element 6018 is correspondingly decremented. If the "method" attribute had specified "oneway" instead of "twoWay", the data binding would have been unidirectional instead of bidirectional. That is to say, modifications to the "value" attribute of the "aolSlider" gadget element 6014 would be replicated in the "value" attribute of the "aolProgressBar" gadget element 6018 but modifications to the "value" attribute of the "aolProgressBar" gadget element 6018 would not be replicated in the "value" attribute of the "aolSlider" gadget element 6014.

In addition to enabling a binding relationship between one box or gadget and another box or gadget to be declared explicitly by specifying the "id" attribute of the box or gadget to be bound as the "elementSource" attribute, the UI framework 124 enables the binding of a box or gadget to one of the box's or the gadget's relatives (i.e., relative binding). Acceptable values for the "elementSource" attribute in the context of relative binding include, for example, "_nextSibling", "_prevSibling", "_root", "_gadget", and "_parent". The child <binding> tag 6024 of the "aolLabel" gadget element 6016 provides an example of relative binding. In particular, the "elementSource" attribute of the child <binding> tag 6024 is specified as "_prevSibling". Thus, the "aolSlider" gadget element 6014 effectively is specified as the "elementSouce" attribute of the child <binding> tag 6024 because the "aolSlider" gadget element 6014 is the previous sibling of the "aolLabel" gadget element 6016 in the rooted hierarchy of the scene file 6000.

In addition to data binding, the UI framework 124 also supports object binding. Object binding allows the attributes or styles of a box or gadget to be data bound to one or more properties of a business logic application object or other object. In order to bind an attribute or style of a box or gadget to a business logic object, an "objectSource" attribute may be used in a <binding> tag instead of an "elementSource" attribute. The "objectSource" attribute specifies that the data source is an application object instead of an element of the UI. The syntax for specifying object binding may take the same form as that for specifying data binding except that the "objectSource" attribute may be substituted for the "elementSource" attribute.

FIGS. 6g(1) and 6g(2) present screenshots of the UI 6600 provided by the UI framework 124 based on scene file 6000 and other referenced files. Window 6006' represents the window described by the "aolWindow" gadget element 6006; box 6008' represents the box described by the "hbox" element 6008; label 6010' represents the label described by the first "aolLabel" gadget element 6010; slider 6014' represents the slider described by the "aolSlider" gadget element 6014; label 6016' represents the label described by the second "aolLabel" gadget element 6016; and progress bar 6020' represents the progress bar described by the "aolProgressBar" gadget element 6020.

The screenshot of the UI 6600 illustrated in FIG. 6g(1) represents the UI 6600 immediately after it was first rendered on the display 106. The screenshot of the UI 6600 illustrated in FIG. 6g(2) represents the UI 6600 some time after the UI 6600 was first rendered on the display 106 and after the up arrow key on the keyboard 104 was depressed 27 times. As discussed in greater detail below, the "aolSlider" gadget definition inherits a default set of behaviors from a "slider" behavior definition that specifies, among other things, that a "NudgeUp" function is called each time the up arrow key is depressed. The "NudgeUp" function causes the gripper element 6602 of the slider 6014' to move one position to the right each time the up arrow key is depressed. Thus, the screenshot of the UI 6600 illustrated in FIG. 6g(2) shows the gripper element 6602 of the slider 6014' 27 positions to the right of the gripper element 6602 in FIG. 6g(1). In addition, labels 6010' and 6016' each have been incremented by 27 and the progress bar 6020' has expanded to the right by 27 positions. These changes are a result of the fact that, as described above, tags in the scene file 6000 bind the "aolSlider" gadget element 6014 to the "aolLabel" gadget elements 6010 and 6016 and the "aolProgressBar" gadget element 6012.

FIGS. 6b(1)-6b(4) illustrate an example gadget file 6100 including a library 6102 that includes the "aolWindow" gadget definition 6104, the "aolLabel" gadget definition 6106, the "aolSlider" gadget definition 6108, and the "aolProgressBar" gadget definition 6110.

As an example of a gadget definition, the "aolWindow" gadget definition 6104 specifies base attributes, parts, and behaviors of the "aolWindow" gadget. In particular, the "aolWindow" gadget definition 6104 includes a gadget declaration 6112, an attributes child 6114, a parts child 6116, and a behavior child 6118.

The gadget declaration 6112 includes an "id" attribute (id="aolWindow") that identifies the gadget as "aolWindow" and that allows the gadget to be specified by using the <aolWindow> gadget tag. In addition, the gadget declaration 6112 indicates the base type of box from which the gadget was derived (type="window"), the script type of functions called by the "aolWindow" gadget (language="jscript"), and the location of a file including various functions called by the "aolWindow" gadget (code="box://boxelyToolkit/content/aolWindow.js").

The "aolWindow" attributes child 6114 specifies a set of base attributes such as, for example, focusMode="defer", resizable="true", accRole="window", icon="#bmp.icon.default", minimizable="true", and closable="true", for the "aolWindow" gadget.

The "aolWindow" parts child 6116 includes several children elements from which the "aolWindow" gadget is assembled. In essence, the parts of the "aolWindow" gadget serve as building blocks for constructing the "aolWindow" gadget. Each constituent part is either another gadget element, that itself may include constituent parts, or a box element. In addition, several of the constituent parts may be associated with their own properties, including, for example, styles, behaviors, animations, and script logic such that they are styled differently, behave differently, and call different scripts than other constituent parts of the "aolWindow" gadget.

The "aolWindow" behavior child 6118 declares a set of base behaviors for the "aolWindow" gadget. In particular, the behavior declaration 6118 declares actions to be taken when a "doubleclick" or an "attributeSet" event are dispatched to an instance of the "aolWindow" gadget.

As a second example of a gadget definition, the "aolSlider" gadget definition 6108 specifies the base attributes, parts, and behaviors of the "aolSlider" gadget. In particular, the "aolSlider" gadget definition 6108 includes a gadget declaration 6118, an attributes child 6120, a parts child 6122, and a behavior child 6124. The attributes child 6120 specifies a default set of attributes for the "aolSlider" gadget; the parts child 6122 specifies the constituent parts that make up the "aolSlider" gadget; and the behavior child 6124 specifies a default set of behaviors for the "aolSlider" gadget. In contrast to the behavior child 6118 of the "aolWindw" gadget definition 6104, the behavior child 6124 of the "aolSlider" gadget definition 6108 includes an "inherits" attribute. The "inherits" attribute specifies that the default set of behaviors for the "aolSlider" gadget are inherited from a "slider" behavior definition included in a behaviors.box file.

The gadget file 6100 includes an <?import href="box://boxelyToolkit/content/styles.box"?> import tag 6126 that instructs the parser 302 to parse a styles.box file. Therefore, as will be discussed in greater detail below in connection with FIG. 6d, styles defined in the styles file may be applied to gadgets defined in the gadgets file 6100.

FIG. 6c illustrates an example of a behaviors file 6200. Behaviors file 6200 includes a library 6202 and a "slider" behavior definition 6204. As discussed above in connection with FIGS. 6b(1)-6b(4), the behavior child 6124 of the "aolSlider" gadget definition 6108 includes an "inherits" attribute that specifies that the "aolSlider" gadget inherits a base set of behaviors from the "slider" behavior definition 6204 in the behaviors file 6200. Therefore, the behaviors specified in the "slider" behavior definition 6204 are applied to the "aolSlider" gadget definition 6108 as the base behaviors for the "aolSlider" gadget. As an example of a behavior that will be inherited by the "aolSlider" gadget definition 6108, the "slider" behavior definition 6204 includes a <reaction> tag 6206 that specifies that in response to an event="keyPress" keycode="UP" event, the "NudgeUp" function is to be called. Similarly, the "slider" behavior definition 6204 includes a <reaction> tag 6208 that specifies that in response to an event="keyPress" keycode="DOWN" event, the "NudgeDown" function is to be called.

As discussed above in connection with FIGS. 6b(1)-6b(4), the gadget file 6100 includes an <?import href="box://boxelyToolkit/content/styles.box"?> import tag 6126 that instructs the parser 302 to parse a styles file such that styles defined in the styles file may be applied to gadgets defined in the gadgets file 6100. FIG. 6d illustrates an example of such a style file 6300 including a library 6302 and several style definitions. In particular, the library 6302 includes a "scrollbar" style definition 6304, a "gbox" style definition 6306, an "aolListBox" style definition 6308, a "grid" style definition 6310, a "window" style definition 6312, an "aolWindow" style definition 6314, an "aolHelpBox" style definition 6316, and an "aolAppWindow" style definition 6318. As illustrated in FIG. 6d, the "aolWindow" style definition 6314 uses a tag selector to associate the "aolWindow" style definition 6314 with the "aolWindow" gadget tag. Consequently, the styles included in the "aolWindow" style definition 6314 are applied to the "aolWindow" gadget definition 6104 in the gadget file 6100.

In addition to applying styles to gadget definitions, styles also may be applied to instances of gadgets specified in XML markup. As discussed above in connection with FIG. 6a, the scene file 6000 includes a reference to a toolkit file that includes style definitions. FIGS. 6e(1)-6e(4) present an example of the toolkit file 6400. The toolkit file 6400 includes a library 6402 having an "aolSlider" style definition 6404, an "aolProgressBar" style definition 6406, an "aolWindow" style definition 6408, and an "aolLabel" style definition 6410. Due to the fact that the "aolSlider" style definition 6404 uses a tag selector to associate the "aolSlider" style definition 6404 with the "aolSlider" gadget tag, the styles included in the "aolSlider" style definition 6404 are applied to the instance of the "aolSlider" gadget 6014 declared in the scene file 6000. Similarly, the styles included in the "aolProgressBar" style definition 6406 are applied to the instance of the "aolProgressBar" gadget 6018 declared in the scene file 6000, the styles included in the "aolWindow" style definition 6408 are applied to the instance of the "aolWindow" gadget 6006 declared in the scene file 6000, and the styles included in the "aolLabel" style definition 6410 are applied to the instances of the "aolLabel" gadgets 6010 and 6016 declared in the scene file 6000. As illustrated in FIGS. 6e(1)-6e(4), styles may be applied to individual parts of a gadget in a style definition by using a <part> tag and specifying the "name" attribute with the "id" of the part to which the styles are to be applied.

In addition, FIGS. 6e(1)-6e(4) illustrate how styles may be applied in response to state changes. Considering the "aolSlider" style definition 6404 as an example, the "aolSlider" style definition includes a "gripper" part style definition 6412 for applying styles to the "gripper" part of the "aolSlider" gadget. The "gripper" part style definition 6412 includes two child "state" elements 6414 and 6416. "State" element 6414 specifies that in response to the "gripper" part entering the "pressed" state, the value "000C0C0A" should be subtracted from the fill value of the "gripper" part. Similarly, "state" element 6416 specifies that in response to the "gripper" part entering the "hovered" state, the value "00002233" should be added to the fill color of the "gripper" part.

As discussed above in connection with FIGS. 6b(1)-6b(4), the "aolWindow" gadget definition 6104 references an "aolWindow" JavaScript file that includes various functions called by the "aolWindow" gadget. FIGS. 6f(1) and 6f(2) present an example of an aolWindow JavaScript file 6500. The aolWindow JavaScript file 6500 includes a component function 6502 for creating an object for each instantiation of an "aolWindow" gadget in order to make the functions included in the "aolWindow" JavaScript file 6500 available to each instantiated "aolWindow" gadget. In addition, the "aolWindow" JavaScript file 6500 also includes an on DoubleClickTitlebar function 6504, an on DoubleClickWindow function 6506, an on AccThemeChange function 6508, a toggleMaximized function 6510, an on ClickSystemMenu function 6512, an on DoubleClickSystemMenu function 6514, and an on ClickTitleBar function 6516, each of which may be called by the "aolWindow" gadget. For example, the onDoubleClickTitlebar function 6504 is attached to a mouseDown event by specifying the on:mouseDown attribute in the "aolWindow" gadget definition 6104.

The UI framework 124 enables animation of properties (e.g., attributes or styles) of a box or gadget through markup and script based on the Synchronized Multimedia Integration Language (SMIL) model, a World Wide Web Consortium (W3C) recommendation for describing multimedia presentations using XML: Among other things, SMIL defines timing markup, layout markup, animations, visual transitions, and media embedding. (More information about SMIL may be found at http://www.w3.org/TR/smil-animation/). UI framework 124, however, implements extensions to the SMIL model to provide a developer with more flexibility in designing animations.

An animation may be declared by an <animation> tag that identifies the animation to be applied and an "animator" child element. Several attributes may be specified for an "animator" child element, including, but not limited to, a "name" attribute, a "type" attribute, a "from" attribute, a "to" attribute, a "begin" attribute, and an "end" attribute. The "name" attribute specifies an attribute or style of a box or gadget that is to be animated. The "type" attribute specifies the type of the target attribute or style to be animated. The "from" attribute specifies an initial value of the target attribute before the animation is applied while the "to" attribute specifies the final value of the attribute after the animation has been applied. Similarly, the "begin" and "end" attributes may be used to specify a duration for the animation to be applied. For example, the syntax of an animation declaration may take the form:

```
<animation id="animationId">
    <animate name="attribute" type="attributeType" from="initialValue"
    to="finalValue" begin="startTime" end="endTime">
</animation>
```

In order to provide flexibility with animations, the UI framework 124 supports specifying the "from" and "to" values of the "animation" attribute as variables, which may be set by other attributes of the box or gadget to be animated or by script. The following snippet of markup illustrates an example of how the "to" parameter may be specified as a variable in markup:

```
<animation id="myAnimate">
    <animate name="left" type="style" from="50" to="foo"
    begin="0ms" end="500ms"/>
</animation>
```

In particular, the "from" attribute specifies that the initial value of the "left" attribute of the box or gadget to be animated is 50 and the "to" attribute specifies that the final value of the "left" attribute is the value assigned to the variable "foo". The following snippet of code illustrates an example of a JavaScript function that may be called to assign a value to the variable "foo":

```
function OnPlay( )
{
    var box = scene.getBoxById("theBox");
    box.setAttribute("foo", "400", false);
}
```

When the OnPlay( ) function is called, the value of the "foo" attribute is set to 400 such that when the animation is triggered, the final value of the "left" attribute of the box or gadget to be animated is 400.

The "from" attribute also may be specified using the reserved word "before" which indicates that the initial value of the attribute or style to be animated is the current value of the attribute or style to be animated at the time the animation is triggered. The ability to specify the "from" attribute using the reserved word "before" may allow a generic animation to be developed and applied to multiple attributes or styles without having to specify a particular initial value for each attribute or style to be animated. The following snippet of code illustrates an example of how the "from" attribute may be specified in markup using the reserved word "before":

```
<animate name="left" type="style" from="before" to="50"
begin="0ms" end="1000ms"/>
```

In the above example, the initial value of the "left" attribute of the box or gadget to be animated is not explicitly specified (e.g., hard-coded). Rather, specifying the "from" attribute using the reserved word "before" indicates that the initial value of the "left" attribute of the box or gadget to be animated is the current value of the "left" attribute of the box or gadget to be animated.

Animations may be triggered in response to, for example, setting an attribute or a state change. For example, a style definition associated with a box or gadget to be animated may include an "attribute" child that includes a "name" attribute and an "animate" attribute: <attribute name="animationName" animate="url(#animationName)/> such that when the "name" attribute is set to "true," the animation located at "animationName" is applied. An example of how an animation may be triggered by setting an attribute is described more fully below in connection with FIGS. 7a, 7b, and 7c(1)-7c(3).

Alternatively, a style definition associated with a box or gadget to be animated may include a "state" child that includes a "name" attribute, a target style or attribute to be animated and an "animate" attribute: <state name="state" target style/attribute name="newValue" animate="url(#animationName)/>. The "name" attribute specifies a state change that triggers the animation. The target style/attribute name specifies a new value of the target style or attribute to be animated to be applied in response to the state change. (Typically, the new value of the target style or attribute is set after the completion of the animation.) The "animate" attributes specifies the animation to be applied upon the state change and the location of the animation to be applied.

When an animation is triggered by a state change, the "to" attribute in the "animate" child may be specified using the reserved word "after" which indicates that the final value of the attribute or style to be animated after the animation is applied is to be the new value of the attribute or style to be animated specified in the child "state" element. The ability to specify the "to" attribute using the reserved word "after" may allow a generic animation to be developed and applied to multiple attributes or styles without having to specify a particular final value for each attribute or style to be animated. As such, the ability to specify the "to" attribute using the reserved word "after" may be particularly useful when combined with the ability to specify the "from" attribute with the reserved word "before". The following snippet of code illustrates an example of markup that results in an animation being triggered by a state change. In addition, the snippet illustrates how the to attribute may be specified using the reserved word "after":

```
<animation id="ani.hover">
    <animate name="fill" type="style" from="before" to="after"
    begin="0ms" end="200ms"/>
</animation>
<style id="myBox" fill="url(#redBrush)">
    <state name="hovered"
    fill="url(#greenBrush)"
    animate="url(#ani.hover)"/>
</style>
```

In the above example, the <style> tag specifies that the initial value of the fill attribute of the "myBox" gadget is the value specified at "url(#redBrush)". Similarly, the <state> tag indicates that the "ani.hover" animation is applied to the fill attribute of the "myBox" gadget and that the value of the "fill" attribute is to be set to the value specified at "url(#greenBrush)" in response to the "myBox" gadget entering the "hovered" state. In addition, the "from" attribute of the animator element is specified using the reserved word "before" and the "to" attribute is specified using the reserved word "after". The reserved word "before" indicates that the animation should start with the current value of the "fill" attribute (in this case, the color specified at "url(#redBrush)") and the reserved word "after" indicates that the animation should end with the new value of the "fill" attribute specified in the <state> tag (in this case, the color specified at "url(#greenBrush)"). Consequently, when the animation is triggered by the "myBox" gadget entering the "hovered" state, the initial value of the "fill" attribute of the "myBox" gadget element will be the value specified at "url(#redBrush)" and the final value of the "fill" attribute of the "myBox" gadget element will be the new value for the "fill" attribute specified at "url(#greenBrush)". The animation has the effect, therefore, of animating the transition from the fill color specified at "url(#redBrush)" to the fill color specified at "url(#greenBrush)".

The ability to animate an attribute or style in response to a state change may provide a developer with flexibility in designing both simple and complex animations. For example, instead of abruptly changing the fill color of a box or gadget in response to a mouse hover, a developer may animate the transition of the fill color in response to the mouse hover. For instance, a developer may trigger an animation to be applied to the fill color of a box of gadget such that the fill color of the box or gadget fades from blue into red in response to a mouse hover rather than abruptly switching from blue to red in response to the mouse hover.

FIGS. 7a, 7b, and 7c(1)-7c(3) illustrate an example of a scene file 700 that includes animations, a script file 740 that includes scripts used to set attributes in order to trigger animations, and the corresponding UI 750 described in the scene file 700. Referring specifically to FIG. 7a, the scene file 700 includes a "window" gadget element 702 having a script node 704, a library 706, an image box element 708, and an hbox element 710. hbox element 710 includes a "Move Right" "aolButton" gadget element 712 and "Move Left" "aolButton" gadget element 714.

A screenshot of the UI 750 described in the scene file 700 is presented in FIG. 7c(1). In particular, the UI 750 includes a window 702' corresponding to the "window" gadget element 702, an image within an image box 708' corresponding to the image box element 708, a "Move Right" button 712' corresponding to the "Move Right" "aolButton" gadget element 712, and a "Move Left" button 714' corresponding to the "Move Left" "aolButton" gadget element 714.

Referring again to FIG. 7a, scene file 700 also includes a "myAnimate" animation element 716 for moving the image box 708' to the right and a "myAnimateExit" animation element 718 for moving the image box 708' to the left.

The "myAnimate" animation element 716 includes an animator child element 722 that targets the position property of the image box element 708 by specifying the name="left" and type="style" attributes. (The "left" attribute of an element specifies the horizontal position of the element.) Specifying the "from" attribute as from ="before" and the "to" attribute as to ="400" causes the animation to start with the current position of the image box 708' at the time the animation is triggered and to move the image box 708' to pixel 400. Similarly, the "myAnimateExit" animation element 718 includes an animator child element 724 that also targets the position property of the image box element 708 by specifying the name="left" and type="style" attributes. Specifying the "from" attribute as from ="before" and the "to" attribute as to ="400" causes the animation to start with the current position of the image box 708' at the time the animation is triggered and to move the image box 708' to pixel 50.

The "myAnimate" animation 716 and the "myAnimateExit" animation 718 are applied to the image box element 708 by creating and applying a style 720 to the image box element 708. In particular, the "myAnimate" animation 716 and the "myAnimateExit" animation 718 are applied to the image box 708 by specifying an attribute child 726 with a name="myAnimation" attribute and that references the "myAnimate" animation 716 as well as the "myAnimateExit" animation 718.

The "myAnimate" animation 716 and the "myAnimateExit" animation 718 may be triggered by setting the "name" attribute to "true" through one or more scripts. The scene file 700 references an animateSimplejs JavaScript file in script node 704. An example of the animateSimple JavaScript file 740 is presented in FIG. 7b. As illustrated in FIG. 7b, the animateSimple file 740 includes an OnPlay function 742 and an OnStop function 744. The OnPlay function 742 references setAttribute which takes three arguments: the name of the attribute to be set (i.e., "myAnimation"), the new value for the "myAnimation" attribute, and an indication of whether the scene must be redrawn by the rendering engine 308. The OnStop function 744 references removeAttribute which takes two arguments: the name of the attribute to be set (i.e., "myAnimation") and the value to be removed (i.e., "true") from the "myAnimation" attribute 726.

Referring again to FIG. 7a, the OnPlay function 742 is called by the "Move Right" "aolButton" gadget element 712 in response to a command event. Similarly, the OnStop function 744 is called by the "Move Left" "aolButton" gadget element 714 in response to a command event. Thus, a command event in the "Move Right" "aolButton" gadget element 712 causes the OnPlay function 742 to be called. In turn, the OnPlay function 742 sets the value of the "myAnimation" attribute 726 to "true." As a result, the "myAnimate" animation 716 is triggered and the image box 708' is moved to the right. When a command event in the "Move Left" "aolButton" gadget element 714 occurs, the OnStop function 744 is called and the OnStop function 744 removes the "true" value from the "myAnimation" attribute (e.g., the value is set to false). In response, the "myAnimation" attribute exits the animation state thereby triggering the "myAnimateExit" animation 724 which moves the image box 708' from right to left.

Referring to FIGS. 7c(1)-7c(3), screenshots of the UI 750 described in the scene file 700 illustrating the effect of the "myAnimate" animation 722 are presented. In particular, the screenshot presented in FIG. 7c(1) illustrates the UI 750 before the "myAnimate" animation 722 was triggered. The screenshot presented in FIG. 7c(2) illustrates the UI 750 after the "myAnimate" animation 722 was triggered. A comparison of FIG. 7c(1) with FIG. 7c(2) reveals that during the period of time that elapsed between the time when the screenshot presented in FIG. 7c(1) was taken and the time when the screenshot presented in FIG. 7c(2) was taken, the image box 708' moved toward the right. FIG. 7c(3) illustrates the UI 750 some time after the screenshot presented in FIG. 7c(2) was captured. As revealed by comparing FIG. 7c(2) to FIG. 7c(3), during the period of time that elapsed between the time when the screenshot presented in FIG. 7c(2) was taken and the time when the screenshot presented in FIG. 7c(3) was taken, the image box 708' again moved toward the right.

The UI framework 124 also may support the use of "dynamics" attributes that modify the animation of attributes or styles according to predefined interpolation equations. For example, a "dynamics" attribute in an animation tag may indicate a motion equation (e.g., a spring equation or an acceleration equation) for a moving object. Referring again to FIG. 7a, the animate 724 child of the "myAnimateExit" animation 718 includes a dynamics attribute specifying that an object being animated by the "myAnimateExit" animation 718 should follow a motion equation describing a spring. For example, specifying the dynamics="spring" attribute in the "myAnimateExit" animation 724, causes the image box 708' to move from the right to left and then to bounce from left to right and back again before settling, much like a spring, when the "myAnimateExit" animation 724 is triggered. In addition to a spring motion equation, other "dynamics" attributes also may be supported, such as, for example dynamics that specify a smooth motion equation, an acceleration motion equation, an ease motion equation, a spline motion equation, and a gravity motion equation. The smooth motion equation may cause the animation to gradually accelerate and then gradually decelerate. The acceleration motion equation may cause the animation to continuously accelerate. The ease motion equation may cause the animation to gradually decelerate. The spline motion equation may combine several motion equations into a single motion equation such that several dynamics may be applied over the course of one animation. The gravity motion equation may cause an animation to accelerate and then bounce once before settling.

The UI framework 124 also supports attributes that enable boxes and/or gadgets rendered on the display 106 to be connected or snapped together when they are brought within the vicinity of one another in much the same manner that two magnets snap together when they are brought within the vicinity of one another. That is to say, boxes and/or gadgets may be snapped together not just by being brought into contact with one another, but also upon merely being brought within a certain distance of one another. Additionally, or alternatively, boxes and/or gadgets also may be connected or snapped to the edges of the desktop on a computer display.

A particular UI may include several open windows on the display 106, one or more of which may be capable of being connected to one or more other windows. In some instances, windows that have been connected or snapped together may be dragged across the display 106 as a single component. The ability to connect or snap windows together, as well as the ability to drag such connected windows as if they are one element, may help a user of a desktop application to better organize the desktop application's UI.

Boxes and/or gadgets may be configured so as to enable the boxes and/or gadgets to be snapped or connected together by specifying certain indicators (e.g., attributes or child elements) for the boxes and/or gadgets. Such indicators may include, for example, a class indicator (e.g., "snapToBoxClass" attribute), an element connection distance indicator (e.g., "snapToBox" attribute), an offset indicator (e.g., "snapToOffset" attribute), an order indicator (e.g., "snapToBoxOrder" attribute), and a desktop connection distance indicator (e.g., "snapToWorkspace" attribute).

In order to be snapped together, two elements must share the same class. The element connection distance indicator specifies how close, for example, in number of pixels, an element must be brought to another element of the same class in order to be snapped together with the other box or gadget. The offset indicator specifies whether an object will be snapped flush together with another box or gadget of the same class or whether there will be an offset. The order indicator specifies how two or more elements of the same class will interact after being snapped together. Finally, the desktop connection distance indicator specifies how close, for example, in number of pixels, an element must be brought to the edge of the desktop in order to be snapped to the desktop.

Referring to FIGS. 8c(1)-8c(4), markup for specifying attributes that enable the elements (e.g., windows) to be snapped together or connected with other elements is illustrated. In particular, FIG. 8a presents a sample scene file 800 for generating several children scenes. The scene file 800 includes an "aolWindow" gadget element 802 having an "aolButton" child gadget element 804. When the "aolButton"

rendered on the display is clicked, the "Create( )" function located in a magnetic.js JavaScript file is called.

Figure 8B:
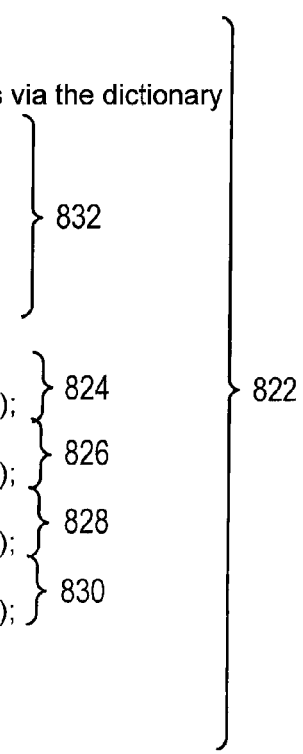
FIG. 8*b* is an illustration showing a sample script file.

FIG. 8*b* presents an example of the magnetic JavaScript file 820. In particular, the magnetic file includes the "Create( )" function 822. When the "Create( )" function is called, four children scene files, magnetic_child1.box, magnetic_child2.box, magnetic_child3.box, and magnetic_child4.box are opened by calling the shell.openScene( ) function four times 824, 826, 828, and 830. In addition, each scene file is made a hierarchical child of the main scene file 800 by passing an additional argument ("_isChildWindow") via a dictionary object 832.

FIG. 8*c*(1) presents a sample of the "magnetic_child1" child scene file 840. The scene file 840 includes an "aolWindow" gadget element 842 that specifies a snapToWorkspace="15" attribute, a snapToBox="20" attribute, a snapToBoxOrder="0" attribute, and a snapToBoxClass="magClass1" attribute.

FIG. 8*c*(2) presents a sample of the "magnetic_child2" child scene file 850. The scene file 850 includes an "aolWindow" gadget element 852 that specifies a snapToWorkspace="15" attribute, a snapToBox="20" attribute, a snapToBoxOrder="1" attribute, and a snapToBoxClass="magClass 1" attribute.

FIG. 8*c*(3) presents a sample of the "magnetic_child3" child scene file 860. The scene file 860 includes an "aolWindow" gadget element 862 that specifies a snapToWorkspace="15" attribute, a snapToBox="20" attribute, a snapToBoxOrder="0" attribute, and a snapToBoxClass="magClass2" attribute, and a snapToOffset="0" attribute.

FIG. 8*c*(4) presents a sample of the "magnetic_child4" child scene file 870. The scene file 870 includes an "aolWindow" gadget element 872 that specifies a snapToWorkspace="15" attribute, a snapToBox="20" attribute, a snapToBoxOrder="1" attribute, and a snapToBoxClass="magClass2" attribute, and a snapToOffset="−10" attribute.

FIGS. 8*d*(1)-8*d*(5) present screenshots of four windows 842', 852', 862', and 872' corresponding to "aolWindow" gadget elements 842, 852, 862, and 872 respectively that illustrate how the four windows 842', 852', 862', and 872' may be snapped together, dragged, and unsnapped.

Due to the fact that they share the same "snapToBoxClass" attribute, windows 842' and 852' may be snapped together and windows 862' and 872' may be snapped together. However, neither of window 842' or window 852' may be snapped together with either of window 862' or window 872' because windows 842' and 852' do not have the same "snapToBoxClass" attribute as either of windows 862' and 872'.

In FIG. 8*d*(1), none of the windows 842', 852', 862' and 872' are close enough to another window to snap to another window.

Referring to FIG. 8*d*(2), window 842' was brought close enough to window 852' that windows 842' and 852' snapped together. Due to the fact that neither of "aolWindow" gadget elements 842 or 852 specify a "snapToOffset" attribute, windows 842' and 862' snap together with no offset.

Referring to FIG. 8*d*(3), window 872' was brought close enough to window 862' that windows 862' and 872' snapped together. Due to the fact that "aolWindow" gadget element 872 specifies a "snapToOffset" of −10, there is an offset equal to −10 pixels on the boundary of windows 862' and 872'. That is to say, window 872' overlaps window 862' by −10 pixels.

Dragging a window that is snapped to one or more windows having a higher "snapToBoxOrder" attribute will cause the dragged window and any other windows having a higher "snapToBoxOrder" attribute and that are connected to the dragged window to be moved. In contrast, dragging a window that is snapped to one or more windows having a lower "snapToBoxOrder" attribute will cause the dragged window to unsnap from the windows having lower "snapToBoxOrder" attributes.

Referring to FIG. 8*d*(4), window 842' has been dragged to the left. Because window 852' has a "snapToBoxOrder" attribute (i.e., "1") that is higher than the "snapToBoxOrder" attribute for window 842' (i.e., "0"), window 852' was moved along with window 842'. In other words, the connection between window 842' and 852' was preserved.

Referring to FIG. 8*d*(5), window 872' has been dragged to the right. Because window 872' has a "snapToBoxOrder" attribute (i.e., 1) that is higher than the "snapToBoxOrder" attribute for window 862' (i.e., "0"), dragging window 872' caused window 872' to be unsnapped from window 862'. In other words, the connection between window 862' and window 872' was severed.

A number of implementations have been described. Nevertheless, it will be understood that various modifications may be made. For example, in the implementations described above, various properties of boxes and gadgets have been discussed in the context of being specified as attributes whereas other properties of boxes and gadgets have been discussed in the context of being specified as child elements. Nonetheless, in other implementations, any properties of a box or gadget described above as being set by specifying an attribute of a box or gadget may be set by specifying a child element of the box or gadget. Similarly, any properties of a box or gadget described above as being set by specifying a child element of a box or gadget may be set by specifying an attribute of the box or gadget. Also, while scripting functions generally are described as being implemented in JavaScript, any scripting language may be used to implement scripts. In addition, while gadget definitions, style definitions, behavior definitions, and other resources frequently have been discussed as being located in files that are separate from the scene file, gadget definitions, style definitions, behavior definitions, and other resources may be located within the scene file. Moreover, attributes, styles, behaviors, and animations in addition to those disclosed herein also are contemplated.

The described systems, methods, and techniques are not limited to any particular hardware or software configuration. Rather, they may be implemented in digital electronic circuitry, computer hardware, firmware, software, or in combinations thereof.

Apparatuses embodying these techniques may include appropriate input and output devices, a computer processor, and a computer program product tangibly embodied in a machine-readable storage device for execution by a programmable processor.

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Furthermore, advantageous results may be achieved if the disclosed techniques are performed in a different order and/or if components in the disclosed systems are combined in a different manner and/or replaced or supplemented by other components. Accordingly, other implementations are within the scope of the following claims.

What is claimed is:

1. A system for providing a user interface comprising:
   at least one processing element; and
   a data storage system storing:
     a first element tag, the first element tag specifying a first element of the user interface that is associated with a class of connectable elements and including a first order indicator, the first order indicator specifying an order of the first element of the user interface within the class of connectable elements:
     a second element tag, the second element tag specifying a second element of the user interface that is associated with the class of connectable elements such that the first element of the user interface and the second element of the user interface can be connected, the second element tag including a second order indicator, the second order indicator specifying an order of the second element of the user interface within the class of connectable elements such that the order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface, when the first element of the user interface is moved; and
     instructions that, when executed by the at least one processing element, cause the at least one processing to implement the following:
       a parser to parse the first element tag and the second element tag, and to generate an object model based on the parsed first element tag and the parsed second element tag, the object model including a first element object corresponding to the first element of the user interface and a second element object corresponding to the second element of the user interface;
       a layout engine to determine, based on the object model, a layout of the user interface; and
       a rendering engine to render, based on the determined layout, the user interface.

2. The system for providing a user interface of claim 1 wherein:
   the first element tag further comprises a first class indicator, the first class indicator associating the first element of the user interface with the class of connectable elements; and
   the second element tag further comprises a second class indicator, the second class indicator associating the second element of the user interface with the class of connectable elements.

3. The system for providing a user interface of claim 1 wherein the first element tag further comprises an element connection distance indicator, the element connection distance indicator specifying a connection distance between the first element of the user interface and the second element of the user interface such that, when the first element of the user interface is brought within the connection distance of the second element of the user interface, the first element of the user interlace and the second element of the user interface are connected automatically.

4. The system for providing a user interface of claim 1 wherein the first element tag further comprises a connection offset indicator, the connection offset indicator specifying a connection offset distance such that, when the first element of the user interface and the second element of the user interface are connected, the first element of the user interface and the second element of the user interface are offset by a distance equal to the connection offset distance.

5. The system for providing a user interface of claim 1, the system further comprising a third element tag, the third element tag specifying a third element of the user interface that is associated with a different class of elements, wherein the third element of the user interface cannot be connected to the first element of the user interface or the second element of the user interface because the first element of the user interface and the second element of the user interface both are associated with the class of connectable elements and the third element of the user interface is associated with the different class of elements.

6. The system for providing a user interface of claim 1 wherein the first element tag further comprises a desktop connection distance indicator, the desktop connection distance indicator specifying a connection distance between the first element of the user interface and an edge of a desktop such that when the first element of the user interface is brought within the connection distance of the edge of the desktop, the first element of the user interface is connected to the edge of the desktop automatically.

7. The system for providing a user interface of claim 1 wherein the user interface comprises a desktop application user interface.

8. A method for providing a user interface comprising:
   parsing a first element tag, the first element tag specifying a first element of the user interface that is associated with a class of connectable elements and including a first order indicator, the first order indicator specifying an order of the first element of the user interface within the class of connectable elements;
   parsing a second element tag, the second element tag specifying a second element of the user interface that is associated with the class of connectable elements such that the first element of the user interface and the second element of the user interface can be connected, the second element tag including a second order indicator, the second order indicator specifying an order of the second element of the user interface within the class of connectable elements such that the order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved;
   generating an object model based on the first element tag and the second element tag, the object model including a first element object corresponding to the first element of the user interface and a second element object corresponding to the second element of the user interface;
   determining, based on the object model, a layout of the user interface;
   rendering, based on the determined layout, the user interface;

connecting the first element of the user interface and the second element of the user interface;

preserving the connection between the first element of the user interface and the second element of the user interface when the second element of the user interface is moved; and severing the connection between the first element of the user interface and the second element of the user interface when the first element of the user interface is moved.

9. The method for providing a user interface of claim 8 wherein the first element tag further comprises a first class indicator, the first class indicator associating the first element of the user interface with the class of connectable elements, and the second element tag further comprises a second class indicator, the second class indicator associating the second element of the user interface with the class of connectable elements.

10. The method for providing a user interface of claim 8, wherein the first element rag further comprises an element connection distance indicator, the element connection distance indicator specifying a connection distance between the first element of the user interface and the second element of the user interface such that when the first element of the user interface is brought within the connection distance of the second element of the user interface, the first element of the user interface and the second element of the user interface are connected automatically, the method further comprising:

determining that the first element of the user interface is within the connection distance of the second element of the user interface, and wherein connecting the first element of the user interface and the second element of the user interface comprises connecting the first element of the user interface and the second element of the user interface in response to determining that the first element of the user interface is within the connection distance of the second element of the user interface.

11. The method for providing a user interface of claim 9 wherein:

the first element tag further comprises a connection offset indicator, the connection offset indicator specifying a connection offset distance; and connecting the first element of the user interlace and the second element of the user interface comprises connecting the first element of the user interface and the second element of the user interface such that the first element of the user interface and the second element of the user interface arc offset by a distance equal to the connection offset distance.

12. The method for providing a user interface of claim 8 wherein the first element tag further comprises a desktop connection distance indicator, the desktop connection distance indicator specifying a connection distance between the first element of the user interface and an edge of a desktop such that when the first element of the user interface is brought within the connection distance of the edge of the desktop, the first element of the user interface is connected to the edge of the desktop automatically, the method further comprising:

determining that the first element of the user interface is within the connection distance of the edge of the desktop; and connecting the first element of the user interface to the edge of the desktop in response to determining that the first element of the user interface is within the connection distance of the edge of the desktop.

13. The method for providing a user interface of claim 8 further comprising:

parsing a third element tag, the third element tag specifying a third element of the user interface that is associated with a different class of elements; and preventing the third element of the user interface from being connected to the first element of the user interface or the second element of the user interface because the first element of the user interface and the second element of the user interface both are associated with the class of connectable elements and the third element of the user interface is associated with the different class of elements.

14. The method for providing a user interface of claim 8 wherein the user interface comprises a desktop application user interface.

15. A computer useable storage medium storing a computer program, the computer program including instructions that, when executed, cause a computer to:

parse a first element tag, the first element tag specifying a first element of a user interface that is associated with a class of connectable elements and including a first order indicator, the first order indicator specifying an order of the first element of the user interface within the class of connectable elements;

parse a second element tag, the second element tag specifying a second element of the user interface that is associated with the class of connectable elements such that the first element of the user interface and the second element of the user interface can be connected, the second element tag including a second order indicator, the second order indicator specifying an order of the second element of the user interface within the class of connectable elements such that the order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved;

generate an object model based on the first element tag and the second element tag, the object model including a first element object corresponding to the first element of the user interface and a second element object corresponding to the second element of the user interface;

determine, based on the object model, a layout of the user interface;

render, based on the determined layout, the user interface;

connect the first element of the user interface and the second element of the user interface;

preserve the connection between the first element of the user interface and the second element of the user interface when the second element of the user interface is moved; and sever the connection between the first element of the user interface and the second element of the user interface when the first element of the user interface is moved.

16. The computer usable storage medium of claim 15 wherein:
- the first element tag further comprises a first class indicator, the first class indicator associating the first element of the user interface with the class of connectable elements; and
- the second element tag further comprises a second class indicator, the second class indicator associating the second element of the user interface with the class of connectable elements.

17. The computer usable storage medium of claim 15 wherein:
- the first element tag further comprises an element connection distance indicator, the element connection distance indicator specifying a connection distance between the first element of the user interface and the second element of the user interface such that when the first element of the user interface is brought within the connection distance of the second element of the user interface, the first element of the user interface and the second element of the user interface are connected automatically;
- the computer program further includes instructions that, when executed, cause a computer to determine that the first element of the user interface is within the connection distance of the second element of the user interface; and
- the instructions that, when executed, cause a computer to connect the first element of the user interface and the second element of the user interface include instructions that, when executed, cause a computer to automatically connect the first element of the user interface and the second element of the user interface in response to a determination that the first element of the user interface is within the connection distance of the second element of the user interface.

18. The computer usable medium of claim 15 wherein:
- the first element tag further comprises a connection offset indicator, the connection offset indicator specifying a connection offset distance; and
- the instructions that, when executed, cause a computer to connect the first element of the user interlace and the second element of the user interface include instructions that, when executed, cause a computer to connect the first element of the user interface and the second element of the user interface such that the first element of the user interface and the second element of the user interface are offset by a distance equal to the connection offset distance.

19. The computer usable medium of claim 15 wherein:
- the first element tag further comprises a desktop connection distance indicator, the desktop connection distance indicator specifying a connection distance between the first element of the user interface and an edge of a desktop such that when the first element of the user interface is brought within the connection distance of the edge of the desktop, the first element of the user interlace is connected to the edge of the desktop automatically; and
- the computer program further includes instructions that, when executed, cause a computer to;
  - determine that the first element of the user interface is within the connection distance of the edge of the desktop; and
  - connect the first element of the user interface to the edge of the desktop in response to a determination that the first element of the user interface is within the connection distance of the second element of the user interface.

20. The computer usable medium of claim 15 wherein the computer program further includes instructions that, when executed, cause a computer to:
- parse a third element tag, the third element tag specifying a third element of the user interface that is associated with a different class of elements; and
- prevent the third element of the user interface from being connected to the first element of the user interface or the second element of the user interface because the first element of the user interface and the second element of the user interface both are associated with the class of connectable elements and the third element of the user interface is associated with the different class of elements.

21. The system of claim 1 wherein:
- the first order indicator included within the first element tag is a snapping order attribute of the first element tag that specifies the order of the first element of the user interface within the class of connectable elements; and
- the second order indicator included within the second element tag is a snapping order attribute that specifies the order of the second element of the user interface within the class of connectable elements such that the order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved.

22. The method of claim 8 wherein:
- the first order indicator included within the first element tag is a snapping order attribute of the first element tag that specifies the order of the first element of the user interface within the class of connectable elements; and
- the second order indicator included within the second element tag is a snapping order attribute that specifies the order of the second element of the user interface within the class of connectable elements such that the order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved.

23. The method of claim 8 wherein:
- generating an object model based on the first element tag and the second element tag includes generating an object model based on parsing the first element tag and the second element tag, the object model including:
  - a first element object that corresponds to the first element of the user interface and that is of the order specified for the first element of the user interface, and
  - a second element object that corresponds to the second element of the user interface and that is of the order specified for the second element of the user interface;
- preserving the connection between the first element of the user interface and the second element of the user interface when the second element of the user interface is moved includes preserving the connection between the first element of the user interface and the second element of the user interface when the second element of the user interface is moved based on the order of the first element object and the order of the second element object; and severing the connection between the first element of the user interface and the second element of the user interface when the first element of the user interface is moved includes severing the connection between the first element of the user interface and the second element of the user interface when the first element of the user interface is moved based on the order of the first element object and the order of the second element object.

24. The computer usable storage medium of claim 15 wherein:

the first order indicator included within the first element tag is a snapping order attribute of the first element tag that specifies the order of the first element of the user interface within the class of connectable elements; and the second order indicator included within the second element tag is a snapping order attribute that specifies the order of the second element of the user interface within the class of connectable elements such that the order of the first element of the user interface and the order of the second element of the user interface are related such that, when the first element of the user interface and the second element of the user interface are connected, the first element of the user interface remains connected to the second element of the user interface when the second element of the user interface is moved, and the first element of the user interface is separated from the second element of the user interface when the first element of the user interface is moved.

25. A system for providing a user interface comprising:

at least one processing element; and a data storage system storing:

a first element tag that specifies a first element of the user interface and that includes:

a first class attribute that specifies that the first element is associated with a particular class of connectable elements, and a first order attribute that specifies an order of the first element within the particular class of connectable elements;

a second element tag that specifies a second element of the user interface and that includes:

a second class attribute that specifies that the second element is associated with the same particular class of connectable elements as the first element such that the first element of the user interface and the second element of the user interface can be connected, and a second order attribute that specifies an order of the second element within the particular class of connectable elements, the order of the first element and the order of the second element being related such that, when the first element and the second element are connected:

the first element remains connected to the second element while the second element is moved, and the first element is separated from the second element when the first element is moved; and instructions that, when executed by the at least one processing element, cause the at least one processing element to implement the following:

a parser to parse the first element tag and the second element tag, and to generate an object model based on the parsed first element tag and the parsed second element tag, the object model including a first element object corresponding to the first element and a second element object corresponding to the second element, a layout engine to determine, based on the object model, a layout of the user interface, and a rendering engine to render, based on the determined layout, the user interface.

* * * * *

UNITED STATES PATENT AND TRADEMARK OFFICE
CERTIFICATE OF CORRECTION

| | | |
|---|---|---|
| PATENT NO. | : 7,739,611 B2 | Page 1 of 1 |
| APPLICATION NO. | : 11/410296 | |
| DATED | : June 15, 2010 | |
| INVENTOR(S) | : Peter David Hirschberg et al. | |

It is certified that error appears in the above-identified patent and that said Letters Patent is hereby corrected as shown below:

In claim 11, column 29, line 51, "arc offset" should read -- are offset --.

In claim 18, column 31, line 41, "interlace" should read -- interface --.

In claim 19, column 31, line 56, "interlace" should read -- interface --.

In claim 19, column 31, line 59, "computer to;" should read -- computer to: --.

Signed and Sealed this

Twenty-first Day of September, 2010

David J. Kappos
*Director of the United States Patent and Trademark Office*